United States Patent
Liu et al.

(10) Patent No.: US 10,433,186 B2
(45) Date of Patent: Oct. 1, 2019

(54) METHOD AND APPARATUS FOR TRANSMITTING SIGNALING

(71) Applicant: Huawei Technologies Co., Ltd., Shenzhen (CN)

(72) Inventors: Yalin Liu, Shanghai (CN); Peter Loc, Cupertino, CA (US); Chixiang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 15/073,507

(22) Filed: Mar. 17, 2016

(65) Prior Publication Data

US 2016/0205565 A1 Jul. 14, 2016

Related U.S. Application Data

(63) Continuation of application No. PCT/CN2013/083766, filed on Sep. 18, 2013.

(51) Int. Cl.
*H04W 24/02* (2009.01)
*H04J 11/00* (2006.01)
*H04L 27/20* (2006.01)
*H04W 84/12* (2009.01)
*H04L 27/34* (2006.01)
*H04L 5/00* (2006.01)

(52) U.S. Cl.
CPC ............. *H04W 24/02* (2013.01); *H04J 11/00* (2013.01); *H04L 27/2035* (2013.01); *H04L 27/2046* (2013.01); *H04L 5/0007* (2013.01); *H04L 27/34* (2013.01); *H04W 84/12* (2013.01)

(58) Field of Classification Search
CPC ......... B41J 2/2132; H04J 11/00; H04L 27/20; H04L 27/2604; H04N 1/60; H04N 1/00392; H04W 24/02; G03B 21/00
See application file for complete search history.

(56) References Cited

U.S. PATENT DOCUMENTS 5,600,429 A * 2/1997 Kutsuwada ........ H04N 1/00392
355/24
8,228,806 B2 7/2012 Pare, Jr. et al.
(Continued)

FOREIGN PATENT DOCUMENTS

CN 1839605 A 9/2006
CN 101924731 A 12/2010
(Continued)

OTHER PUBLICATIONS

Ponnampalam, Vish, "11ac Auto-Detection: Further Results," Mediatek, IEEE 802.11-10/0874r1, Jul. 14, 2010, 9 pages.
(Continued)

*Primary Examiner* — Jamaal Henson
(74) *Attorney, Agent, or Firm* — Slater Matsil, LLP

(57) ABSTRACT

A method includes: modulating, by using a binary phase shift keying BPSK manner of rotation by a first angle, at least partial signaling information carried in at least one signaling symbol in a signaling field of a data packet, to obtain modulated signaling information, where the first angle is not equal to 0 degrees or 90 degrees; and sending, to a receive end, the data packet that carries the modulated signaling information.

19 Claims, 11 Drawing Sheets

Modulate, by using a binary phase shift keying BPSK manner of rotation by a first angle, at least partial signaling information carried in at least one signaling symbol in a signaling field of a data packet, to obtain modulated signaling information, where the first angle is not equal to 0 degrees or 90 degrees — 110

Send, to a receive end, the data packet that carries the modulated signaling information — 120

(56) References Cited

U.S. PATENT DOCUMENTS

| | | | |
|---|---|---|---|
| 2005/0174927 A1* | 8/2005 | Stephens | H04L 27/20 370/206 |
| 2006/0193244 A1* | 8/2006 | Le Goff | H04L 27/2604 370/206 |
| 2010/0260159 A1 | 10/2010 | Zhang et al. | |
| 2011/0043833 A1* | 2/2011 | Swanson | B41J 2/2132 358/1.9 |
| 2011/0096685 A1* | 4/2011 | Lee | H04L 27/0012 370/252 |
| 2011/0110443 A1 | 5/2011 | Kwon et al. | |
| 2011/0206156 A1* | 8/2011 | Lee | H04L 27/0008 375/279 |
| 2011/0222519 A1* | 9/2011 | Liao | H04L 27/2621 370/338 |
| 2013/0107912 A1 | 5/2013 | Ponnampalam | |

FOREIGN PATENT DOCUMENTS

| | | | |
|---|---|---|---|
| CN | 102055713 A | 5/2011 | |
| CN | 102396186 A | 3/2012 | |
| CN | 102714648 A | 10/2012 | |
| WO | 2012006513 A1 | 1/2012 | |

OTHER PUBLICATIONS

IEEE Computer Society, IEEE Standards Association, "IEEE Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications, Amendment 4: Enhancements for Very High Throughput for Operation in Bands Below 6 GHz," IEEE Std 802.11ac-2013, 425 pages.

Chun, Jinyoung, et al., "Legacy Support on HEW frame structure," Sep. 16, 2013, IEEE 11-13/1057r0, 8 pages.

IEEE Computer Society, IEEE Standards Association, "IEEE Standard for Information Technology—Telecommunications and Information Exchange Between Systems Local and Metropolitan Area Networks—Specific Requirements, Part 11: Wireless Lan Medium Access Control (MAC) and Physical Layer (PHY) Specifications," IEEE Std 802.11-2012, Part 1, 1000 pages.

IEEE Computer Society, IEEE Standards Association, "IEEE Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications," IEEE Std 802.11-2012, Part 2, 1000 pages.

IEEE Computer Society, IEEE Standards Association, "IEEE Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications," IEEE Std 802.11-2012, Part 3, 793 pages.

* cited by examiner

BPSK - rotation by 45 degrees

BPSK - rotation by 135 degrees

BPSK - rotation by 225 degrees

BPSK - rotation by 315 degrees

METHOD AND APPARATUS FOR TRANSMITTING SIGNALING

This application is a continuation of International Patent Application No. PCT/CN2013/083766, filed on Sep. 18, 2013, which is hereby incorporated by reference in its entirety.

TECHNICAL FIELD

Embodiments of the present invention relate to the field of communications technologies, and more specifically, to a method and an apparatus for transmitting signaling.

BACKGROUND

As intelligent terminals are applied in a wide range, people have a growing requirement on data traffic of a network. In order to meet people's growing network requirement and improve performance of a system, a system and a standard in a wireless local area network (WLAN) experienced evolution for multiple times. A Wi-Fi system is used as an example. A standard of the Wi-Fi system evolves successively from IEEE (Institute of Electrical and Electronics Engineers) 802.11a/b to IEEE 802.11g, IEEE 802.11n, and IEEE802.11ac.

In the standard of 802.11n, two physical-layer frame formats are defined for a data packet: an HT mixed format and an HT Greenfield format. In the standard of 802.11ac, a very high throughput (VHT) format is defined. A BPSK modulation manner is used for a signaling field of a data packet of a legacy format, a QBPSK modulation manner is used for a signaling field of a data packet of a high throughput, and BPSK and QBPSK modulation manners are used for a signaling field of a data packet of a very high throughput.

Currently, the IEEE 802.11 working group founded a High Efficiency WLAN Study Group (HEW SG). An objective of the High Efficiency WLAN Study Group is to construct a next generation wireless local area network and enhance spectral efficiency, so as to further improve a system throughput and an area throughput, thereby providing a better service for a user. The High Efficiency WLAN Study Group introduces a data packet of a new format, that is, a data packet of a HEW format.

At a receive end, signaling information of different modulation manners can be used for detection, so as to determine a corresponding format of a data packet. Therefore, which modulation manner is to be used for modulation of a signaling field of a data packet of a HEW format is a problem to be urgently resolved.

SUMMARY

Embodiments of the present invention provide a method and an apparatus for transmitting signaling, in which a signaling field of a data packet can be modulated by using a new modulation manner.

According to a first aspect, a method for transmitting signaling is provided, including: modulating, by using a binary phase shift keying BPSK manner of rotation by a first angle, at least partial signaling information carried in at least one signaling symbol in a signaling field of a data packet, to obtain modulated signaling information, where the first angle is not equal to 0 degrees or 90 degrees; and sending, to a receive end, the data packet that carries the modulated signaling information.

With reference to the first aspect, in a first possible implementation manner, the first angle is N*45 degrees, and N is an integer not equal to 0 or 2.

With reference to the first aspect or the first possible implementation manner, in a second possible implementation manner, the modulating, by using a BPSK manner of rotation by a first angle, at least partial signaling information carried in at least one signaling symbol in a signaling field of a data packet includes: modulating all signaling information carried in one signaling symbol in the signaling field of the data packet by using a BPSK manner of rotation by 45 degrees.

With reference to the first aspect or the first possible implementation manner, in a third possible implementation manner, the modulating, by using a BPSK manner of rotation by a first angle, at least partial signaling information carried in at least one signaling symbol in a signaling field of a data packet includes: modulating all signaling information carried in two signaling symbols in the signaling field of the data packet by using a BPSK manner of rotation by 45 degrees.

With reference to the first aspect or the first possible implementation manner, in a fourth possible implementation manner, the modulating, by using a BPSK manner of rotation by a first angle, at least partial signaling information carried in at least one signaling symbol in a signaling field of a data packet includes: modulating, by using a BPSK manner of rotation by 45 degrees, all signaling information carried in all signaling symbols in the signaling field of the data packet.

With reference to the first aspect or the first possible implementation manner, in a fifth possible implementation manner, the method according to the first aspect further includes: modulating, by using a BPSK manner of rotation by a second angle, signaling information carried in another signaling symbol, except the at least one signaling symbol, in the signaling field of the data packet, where the second angle is M*45 degrees, and M is an integer.

With reference to the first aspect or the first possible implementation manner, in a sixth possible implementation manner, the at least one signaling symbol is at least one orthogonal frequency division multiplexing OFDM symbol, and subcarriers corresponding to each OFDM symbol in the at least one OFDM symbol include an even-numbered subcarrier and an odd-numbered subcarrier; and the modulating, by using a BPSK manner of rotation by a first angle, at least partial signaling information carried in at least one signaling symbol in a signaling field of a data packet includes: modulating, by using the BPSK manner of rotation by the first angle, first partial signaling information carried on either of the even-numbered subcarrier and the odd-numbered subcarrier.

With reference to the sixth possible implementation manner, in a seventh possible implementation manner, the method according to the first aspect further includes: modulating, by using a BPSK manner of rotation by a second angle, second partial signaling information carried on the other one of the even-numbered subcarrier and the odd-numbered subcarrier, where the second angle is M*45 degrees, and M is an integer.

With reference to the seventh possible implementation manner, in an eighth possible implementation manner, the first angle is 45 degrees, and the second angle is 0 degrees.

With reference to the first aspect or any one of the foregoing possible implementation manners, in a ninth possible implementation manner, a format of the data packet is a high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

With reference to the first aspect or any one of the foregoing possible implementation manners, in a tenth possible implementation manner, the signaling field is a signaling field in an advanced wireless system AWS, and the at least one signaling symbol is at least one of an AWS-SIG1 and an AWS-SIG2.

According to a second aspect, a method for transmitting signaling is provided, including: receiving a data packet sent by a transmit end, where a signaling field of the data packet carries modulated signaling information; and detecting the modulated signaling information to determine a format of the data packet, where if the transmit end modulates, by using a binary phase shift keying BPSK manner of rotation by a first angle, at least partial signaling information carried in at least one signaling symbol in the signaling field of the data packet, it is determined, by detecting the modulated signaling information, that the format of the data packet is a data packet format corresponding to the BPSK manner of rotation by the first angle, where the first angle is not equal to 0 degrees or 90 degrees.

With reference to the second aspect, in a first possible implementation manner, the first angle is N*45 degrees, and N is an integer not equal to 0 or 2; and the detecting the modulated signaling information to determine a format of the data packet includes: detecting a real part component and an imaginary part component of the signaling information, and comparing a result of the detecting with a preset threshold, to determine the format of the data packet.

With reference to the first possible implementation manner of the second aspect, in a second possible implementation manner, the at least one signaling symbol is at least one orthogonal frequency division multiplexing (Orthogonal Frequency Division Multiplexing, OFDM) symbol, and each piece of signaling information in the modulated signaling information is transmitted on a corresponding subcarrier; and the detecting a real part component and an imaginary part component of the signaling information, and comparing a result of the detecting with a preset threshold, to determine the format of the data packet includes: multiplying a real part component and an imaginary part component of modulated signaling information carried on each subcarrier corresponding to the at least one OFDM symbol to obtain at least one product, and adding up the at least one product to obtain a sum of the at least one product:

$$S_{HEW} = \sum_{i=1}^{N_{SC}} (a_i * b_i),$$

where $N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; comparing $S_{HEW}$ with a first threshold, where the first threshold is greater than or equal to 0; and if $S_{HEW}$ is greater than the first threshold, determining that the format of the data packet is the data packet format corresponding to the binary phase shift keying manner of rotation by the first angle.

With reference to the first possible implementation manner of the second aspect, in a third possible implementation manner, the at least one signaling symbol is at least one OFDM symbol, and the detecting a real part component and an imaginary part component of the signaling information, and comparing a result of the detecting with a preset threshold, to determine the format of the data packet includes: adding up a square of modulated signaling information carried on each subcarrier corresponding to the at least one OFDM symbol to obtain at least one quadratic sum:

$$S = (a_s + jb_s) = \sum_{i=1}^{N_{SC}} (a_i + jb_i)^2,$$

where $N_{SC}$ is a quantity of subcarriers carrying the modulated signaling information, $N_{SC} \geq 1$, $a_i$ is a real part component that is of the signaling information and that is carried on a subcarrier i, $b_i$ is an imaginary part component that is of the signaling information and that is carried on the subcarrier i, $a_s$ is a real part component of S, and $b_s$ is an imaginary part component of S; and determining, according to the real part component and the imaginary part component of S, that the format of the data packet is the data packet format corresponding to the binary phase shift keying manner of rotation by the first angle.

With reference to the third possible implementation manner of the second aspect, in a fourth possible implementation manner, the determining, according to the real part component and the imaginary part component of S, that a modulation manner is the binary phase shift keying manner of rotation by the first angle includes: subtracting a square of the imaginary part component of S from a square of the real part component of S to obtain: $S_{HEW} = a_s^2 - b_s^2$; comparing $S_{HEW}$ with a second threshold, where the second threshold is less than or equal to 0; and if $S_{HEW}$ is less than the second threshold, determining that the format of the data packet is the data packet format corresponding to the binary phase shift keying manner of rotation by the first angle.

With reference to the third possible implementation manner of the second aspect, in a fifth possible implementation manner, the determining, according to the real part component and the imaginary part component of S, that a modulation manner is the binary phase shift keying manner of rotation by the first angle includes: squaring S to obtain: $S_{HEW} = (S)^2$; comparing $S_{HEW}$ with a second threshold, where the second threshold is less than or equal to 0; and if $S_{HEW}$ is less than the second threshold, determining that the format of the data packet is the data packet format corresponding to the binary phase shift keying manner of rotation by the first angle.

With reference to the third possible implementation manner of the second aspect, in a sixth possible implementation manner, the determining, according to the real part component and the imaginary part component of S, that a modulation manner is the binary phase shift keying manner of rotation by the first angle includes: comparing the real part component of S with the imaginary part component of S; and determining, according to a result of comparison between the real part component and the imaginary part component, whether the format of the data packet is the data packet format corresponding to the binary phase shift keying manner of rotation by the first angle.

With reference to the first possible implementation manner of the second aspect, in a seventh possible implementation manner, the at least one signaling symbol is at least one OFDM symbol; and the detecting a real part component and an imaginary part component of the signaling information, and comparing a result of the detecting with a preset threshold, to determine the format of the data packet includes: subtracting a square of an imaginary part component of modulated signaling information carried on each subcarrier corresponding to the at least one OFDM symbol from a square of a real part component of the modulated signaling information carried on each subcarrier co to obtain at least one difference, and adding up the at least one difference to obtain a sum of the at least one difference:

$$S = \sum_{i=1}^{N_{SC}} (a_i^2 - b_i^2),$$

where $N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; comparing S with a first range, where the first range is a subinterval of an open interval $(-N_{SC}, N_{SC})$; and if S is in the first range, determining that the format of the data packet is the data packet format corresponding to the binary phase shift keying manner of rotation by the first angle.

With reference to the seventh possible implementation manner of the second aspect, in an eighth possible implementation manner, if the transmit end modulates at least partial signaling information carried in at least one signaling symbol in the signaling field of the data packet by using a second modulation manner, the method according to the second aspect further includes: comparing S with a second range, where the second range is a subinterval of the open interval $(-N_{SC}, N_{SC})$; and if S is in the second range, determining that the format of the data packet is a data packet format corresponding to the second modulation manner, where the second range is different from the first range, the second modulation manner is BPSK corresponding to a legacy format, QBPSK corresponding to an HT format, or BPSK and QBPSK corresponding to a VHT format.

With reference to the eighth possible implementation manner of the second aspect, in a ninth possible implementation manner, the at least one OFDM symbol includes a first OFDM symbol and a second OFDM symbol, S obtained for the first OFDM symbol is $S_1$, and S obtained for the second OFDM symbol is $S_2$; and
when $$\begin{cases} S_1 < -N_{SC}/2 \\ S_2 < -N_{SC}/2 \end{cases},$$

it is determined that the format of the received data packet is the HT format; or when $$\begin{cases} S_1 > N_{SC}/2 \\ S_2 < -N_{SC}/2 \end{cases},$$

it is determined that the format of the data packet is the VHT format; or
when $$\begin{cases} -N_{SC}/2 < S_1 < N_{SC}/2 \\ -N_{SC}/2 < S_2 < N_{SC}/2 \end{cases},$$

it is determined that the format of the data packet is a HEW format.

With reference to the eighth possible implementation manner of the second aspect, in a tenth possible implementation manner, the at least one signaling symbol includes a first OFDM symbol and a second OFDM symbol, S obtained for the first OFDM symbol is $S_1$, and S obtained for the second OFDM symbol is $S_2$; if $S_1$ is greater than a third threshold and $S_2$ is greater than the third threshold, it is determined that the format of the data packet is a legacy format; or if $S_1$ is greater than a third threshold and $S_2$ is less than a fourth threshold, it is determined that the format of the data packet is the VHT format; or if $S_1$ is less a fourth threshold and $S_2$ is less than the fourth threshold, it is determined that the format of the data packet is the HT format; or if $S_1$ is less a third threshold and $S_1$ is greater than a fourth threshold, and, $S_2$ is less the third threshold and $S_2$ is greater than the fourth threshold, it is determined that the format of the data packet is a HEW format; where the third threshold is greater than 0, and the fourth threshold is less than 0.

With reference to the tenth possible implementation manner of the second aspect, in an eleventh possible implementation manner, the at least one signaling symbol is at least one OFDM symbol, subcarriers in the OFDM symbol include an even-numbered subcarrier and an odd-numbered subcarrier, a signaling symbol carried on either of the odd-numbered subcarrier and the even-numbered subcarrier is modulated by using the binary phase shift keying manner of rotation by the first angle, and a signaling symbol carried on the other one of the odd-numbered subcarrier and the even-numbered subcarrier is modulated by using a binary phase shift keying manner of rotation by a second angle, where the second angle is M*45 degrees, and M is an integer.

With reference to the second aspect or any one of the foregoing possible implementation manners, in a twelfth possible implementation manner, the format of the data packet is the high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

With reference to the second aspect or any one of the foregoing possible implementation manners, in a thirteenth possible implementation manner, the signaling field is a signaling field in an advanced wireless system AWS, and the at least one signaling symbol is at least one of an AWS-SIG1 and an AWS-SIG2.

According to a third aspect, an apparatus for transmitting signaling is provided, including: a modulating module, configured to modulate, by using a binary phase shift keying BPSK manner of rotation by a first angle, at least partial signaling information carried in at least one signaling symbol in a signaling field of a data packet, to obtain modulated signaling information, where the first angle is not equal to 0 degrees or 90 degrees; and a sending module, configured to send, to a receive end, the data packet that carries the modulated signaling information.

With reference to the third aspect, in a first possible implementation manner, the first angle is N*45 degrees, and N is an integer not equal to 0 or 2.

With reference to the third aspect or the first possible implementation manner of the third aspect, in a second possible implementation manner, the modulating module is configured to modulate all signaling information carried in one signaling symbol in the signaling field of the data packet by using a BPSK manner of rotation by 45 degrees.

With reference to the third aspect or the first possible implementation manner of the third aspect, in a second possible implementation manner, the modulating module is configured to modulate all signaling information carried in two signaling symbols in the signaling field of the data packet by using a BPSK manner of rotation by 45 degrees.

With reference to the third aspect or the first possible implementation manner of the third aspect, in a fourth possible implementation manner, the modulating module is configured to modulate, by using a BPSK manner of rotation by 45 degrees, all signaling information carried in all signaling symbols in the signaling field of the data packet.

With reference to the third aspect or the first possible implementation manner of the third aspect, in a fifth possible implementation manner, the modulating module is further configured to modulate, by using a BPSK manner of rotation by a second angle, signaling information carried in another signaling symbol, except the at least one signaling symbol, in the signaling field of the data packet, where the second angle is M*45 degrees, and M is an integer.

With reference to the third aspect or the first possible implementation manner of the third aspect, in a sixth possible implementation manner, the at least one signaling symbol is at least one orthogonal frequency division multiplexing OFDM symbol, and subcarriers corresponding to each OFDM symbol in the at least one OFDM symbol include an even-numbered subcarrier and an odd-numbered subcarrier; and the modulating module is configured to modulate, by using the BPSK manner of rotation by the first angle, first partial signaling information carried on either of the even-numbered subcarrier and the odd-numbered subcarrier.

With reference to the third aspect or the sixth possible implementation manner of the third aspect, in a seventh possible implementation manner, the modulating module is configured to modulate, by using a BPSK manner of rotation by a second angle, second partial signaling information carried on the other one of the even-numbered subcarrier and the odd-numbered subcarrier, where the second angle is M*45 degrees, and M is an integer.

With reference to the seventh possible implementation manner of the third aspect, in an eighth possible implementation manner, the first angle is 45 degrees, and the second angle is 0 degrees.

With reference to the third aspect or any one of the foregoing possible implementation manners, in a ninth possible implementation manner, a format of the data packet is a high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

With reference to the third aspect or any one of the foregoing possible implementation manners, in a tenth possible implementation manner, the signaling field is a signaling field in an advanced wireless system AWS, and the at least one signaling symbol is at least one of an AWS-SIG1 and an AWS-SIG2.

According to a fourth aspect, an apparatus for transmitting signaling is provided, including: a receiving module, configured to receive a data packet sent by a transmit end, where a signaling field of the data packet carries modulated signaling information; and a detecting module, configured to detect the modulated signaling information to determine a format of the data packet, where if the transmit end modulates, by using a binary phase shift keying BPSK manner of rotation by a first angle, at least partial signaling information carried in at least one signaling symbol in the signaling field of the data packet, it is determined, by detecting the modulated signaling information, that the format of the data packet is a data packet format corresponding to the BPSK manner of rotation by the first angle, where the first angle is not equal to 0 degrees or 90 degrees.

With reference to the fourth aspect, in a first possible implementation manner, the first angle is N*45 degrees, and N is an integer not equal to 0 or 2; and the detecting module is configured to detect a real part component and an imaginary part component of the signaling information, and compares a result of the detecting with a preset threshold, to determine the format of the data packet.

With reference to the first possible implementation manner of the fourth, in a second possible implementation manner, the at least one signaling symbol is at least one orthogonal frequency division multiplexing OFDM symbol; and the detecting module is configured to: multiply a real part component and an imaginary part component of modulated signaling information carried on each subcarrier corresponding to the at least one OFDM symbol to obtain at least one product, and add up the at least one product to obtain a sum of the at least one product:

$$S_{HEW} = \sum_{i=1}^{N_{SC}} (a_i * b_i),$$

where
$N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compare $S_{HEW}$ with a first threshold, where the first threshold is greater than or equal to 0; and if $S_{HEW}$ is greater than the first threshold, determine that the format of the data packet is the data packet format corresponding to the binary phase shift keying manner of rotation by the first angle.

With reference to the first possible implementation manner of the fourth aspect, in a third possible implementation manner, the at least one signaling symbol is at least one OFDM symbol; and the detecting module is configured to: add up a square of modulated signaling information carried on each subcarrier corresponding to the at least one OFDM symbol to obtain at least one quadratic sum:

$$S = (a_s + jb_s) = \sum_{i=1}^{N_{SC}} (a_i + jb_i)^2,$$

where
$N_{SC}$ is a quantity of subcarriers carrying the modulated signaling information, $N_{SC} \geq 1$, $a_i$ is a real part component that is of the signaling information and that is carried on a subcarrier i, $b_i$ is an imaginary part component that is of the signaling information and that is carried on the subcarrier i, $a_s$ is a real part component of S, and $b_s$ is an imaginary part component of S; and determine, according to the real part component and the imaginary part component of S, that the format of the data packet is the data packet format corresponding to the binary phase shift keying manner of rotation by the first angle.

With reference to the third possible implementation manner of the fourth aspect, in a fourth possible implementation manner, the detecting module is configured to subtract a square of the imaginary part component of S from a square of the real part component of S to obtain: $S_{HEW} = a_s^2 - b_s^2$; and compares $S_{HEW}$ with a second threshold, where the second threshold is less than or equal to 0; and if $S_{HEW}$ is less than the second threshold, determines that the format of the data packet is the data packet format corresponding to the binary phase shift keying manner of rotation by the first angle.

With reference to the third possible implementation manner of the fourth aspect, in a fifth possible implementation manner, the detecting module is configured to square S to obtain: $S_{HEW} = (S)^2$; compares $S_{HEW}$ with a second threshold, where the second threshold is less than or equal to 0; and if $S_{HEW}$ is less than the second threshold, determines that the format of the data packet is the data packet format corresponding to the binary phase shift keying manner of rotation by the first angle.

With reference to the third possible implementation manner of the fourth aspect, in a sixth possible implementation manner, the detecting module is configured to compare the real part component of S with the imaginary part component of S; and determine, according to a result of comparison between the real part component and the imaginary part component, whether the format of the data packet is the data packet format corresponding to the binary phase shift keying manner of rotation by the first angle.

With reference to the first possible implementation manner of the fourth aspect, in a seventh possible implementation manner, the at least one signaling symbol is at least one OFDM symbol; and the detecting module is configured to subtract a square of an imaginary part component of modulated signaling information carried on each subcarrier corresponding to the at least one OFDM symbol from a square of a real part component of the modulated signaling information carried on each subcarrier co to obtain at least one difference, and adds up the at least one difference to obtain a sum of the at least one difference:

$$S = \sum_{i=1}^{N_{SC}} (a_i^2 - b_i^2),$$

where
$N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compares S with a first range, where the first range is a subinterval of an open interval ($-N_{SC}, N_{SC}$); and if S is in the first range, determines that the format of the data packet is the data packet format corresponding to the binary phase shift keying manner of rotation by the first angle.

With reference to the seventh possible implementation manner of the fourth aspect, in an eighth possible implementation manner, if the transmit end modulates at least partial signaling information carried in at least one signaling symbol in the signaling field of the data packet by using a second modulation manner, the detecting module further compares S with a second range, where the second range is a subinterval of the open interval ($-N_{SC}, N_{SC}$); and if S is in the second range, determines that the format of the data packet is a data packet format corresponding to the second modulation manner, where the second range is different from the first range, the second modulation manner is BPSK corresponding to a legacy format, QBPSK corresponding to an HT format, or BPSK and QBPSK corresponding to a VHT format.

With reference to the eighth possible implementation manner of the fourth aspect, in a ninth possible implementation manner, the at least one OFDM symbol includes a first OFDM symbol and a second OFDM symbol, S obtained for the first OFDM symbol is $S_1$, and S obtained for the second OFDM symbol is $S_2$; and when $$\begin{cases} S_1 < -N_{SC}/2 \\ S_2 < -N_{SC}/2 \end{cases},$$

the detecting module is configured to determine that the format of the received data packet is the HT format; or when $$\begin{cases} S_1 > N_{SC}/2 \\ S_2 < -N_{SC}/2 \end{cases},$$

the detecting module is configured to determine that the format of the data packet is the VHT format; or when $$\begin{cases} -N_{SC}/2 < S_1 < N_{SC}/2 \\ -N_{SC}/2 < S_2 < N_{SC}/2 \end{cases},$$

the detecting module is configured to determine that the format of the data packet is a HEW format.

With reference to the eighth possible implementation manner of the fourth aspect, in a tenth possible implementation manner, the at least one signaling symbol includes a first OFDM symbol and a second OFDM symbol, S obtained for the first OFDM symbol is $S_1$, and S obtained for the second OFDM symbol is $S_2$; if $S_1$ is greater than a third threshold and $S_2$ is greater than the third threshold, it is determined that the format of the data packet is a legacy format; or if $S_1$ is greater than a third threshold and $S_2$ is less than a fourth threshold, it is determined that the format of the data packet is the VHT format; or if $S_1$ is less a fourth threshold and $S_2$ is less than the fourth threshold, it is determined that the format of the data packet is the HT format; or if $S_1$ is less a third threshold and $S_1$ is greater than a fourth threshold, and, $S_2$ is less the third threshold and $S_2$ is greater than the fourth threshold, it is determined that the format of the data packet is a HEW format; where the third threshold is greater than 0, and the fourth threshold is less than 0.

With reference to the tenth possible implementation manner of the fourth aspect, in an eleventh possible implementation manner, the at least one signaling symbol is at least one OFDM symbol, subcarriers in the OFDM symbol include an even-numbered subcarrier and an odd-numbered subcarrier, a signaling symbol carried on either of the odd-numbered subcarrier and the even-numbered subcarrier is modulated by using the binary phase shift keying manner of rotation by the first angle, and a signaling symbol carried on the other one of the odd-numbered subcarrier and the even-numbered subcarrier is modulated by using a binary phase shift keying manner of rotation by a second angle, where the second angle is M*45 degrees, and M is an integer.

With reference to the fourth aspect or any one of the foregoing possible implementation manners, in a twelfth possible implementation manner, the format of the data packet is the high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

With reference to the fourth aspect or any one of the foregoing possible implementation manners, in a thirteenth possible implementation manner, the signaling field is a signaling field in an advanced wireless system AWS, and the at least one signaling symbol is at least one of an AWS-SIG1 and an AWS-SIG2.

According to the embodiments of the present invention, a transmit end can modulate signaling information carried in a signaling symbol in a signaling field of a data packet by using a BPSK manner of rotation by a preset angle. In the embodiments of the present invention, the signaling field of the data packet is modulated by using a modulation manner different from a conventional modulation manner, so that a corresponding data packet format can be detected at a receive end.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
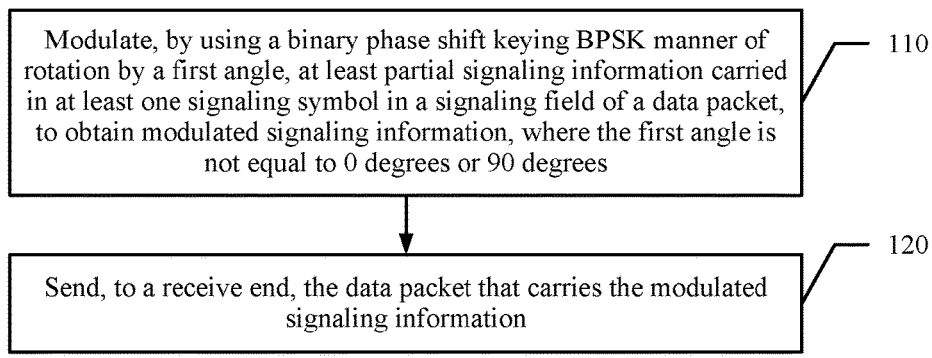
FIG. 1 is a schematic flowchart of a method for transmitting signaling according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, such as a GSM (Global System of Mobile communication, Global System for Mobile Communications) system, a CDMA (Code Division Multiple Access, Code Division Multiple Access) system, a WCDMA (Wideband Code Division Multiple Access, Wideband Code Division Multiple Access) system, a GPRS (General Packet Radio Service, general packet radio service), an LTE (Long Term Evolution, Long Term Evolution) system, an LTE-A (Long Term Evolution Advanced, Long Term Evolution Advanced) system, a UMTS (Universal Mobile Telecommunication System, Universal Mobile Telecommunications System), and WiMAX (Worldwide Interoperability for Microwave Access, Worldwide Interoperability for Microwave Access), which is not limited in the embodiments of the present invention.

The embodiments of the present invention can be used in radio access networks of different standards. Radio access networks in different systems may include different network elements. For example, a network element in a radio access network in LTE and LTE-A includes an eNB (eNodeB, evolved NodeB); network elements in a radio access network in WCDMA include an RNC (Radio Network Controller) and a NodeB; a network element in WiMAX includes a base station; network elements in WLAN/Wi-Fi include an access point (AP) and the like. The embodiments of the present invention impose no limitation on this. However, for ease of description, the following embodiments use an access point in a Wi-Fi system as an example for description.

It should further be understood that in the embodiments of the present invention, a transmit end (UE, User Equipment) includes but is not limited to a mobile station (MS), a mobile terminal, a mobile telephone, a handset, portable equipment, and the like. The transmit end may communicate with one or more core networks by using a radio access network (RAN). For example, the transmit end may be a mobile telephone (or referred to as a "cellular" telephone), a computer having a wireless communication function, or the like; the transmit end may further be a portable, pocket-sized, handheld, computer built-in, or in-vehicle mobile apparatus.

A Wi-Fi system using a HEW technology may utilize an unlicensed frequency band and coexist with an existing Wi-Fi system. Therefore, how to allow a HEW user to be able to identify a data packet of a HEW format without affecting performance of a user in the existing Wi-Fi system is also a problem to be urgently resolved.

At a transmit end of a HEW system, a module for transmitting a signaling field successively performs encoding, interleaving, constellation diagram mapping, inverse discrete Fourier transform, guard interval insertion, multiplying with a time window, and radio frequency processing on to-be-sent signaling. In the embodiments of the present invention, a manner of the constellation diagram mapping is mainly designed at the transmit end.

At a receive end of the HEW system, a receiving module can receive a symbol of the signaling field, detect a format of a data packet, and decode a parameter of the signaling field. In the embodiments of the present invention, a method for detecting a format of a data packet is mainly designed at the receive end.

FIG. 1 is a schematic flowchart of a method for transmitting signaling according to an embodiment of the present invention. The method shown in FIG. 1 is performed by a transmit end (for example, an access point or user equipment). The method shown in FIG. 1 includes the following content:

110. Modulate, by using a binary phase shift keying BPSK manner of rotation by a first angle, at least partial signaling information carried in at least one signaling symbol in a signaling field of a data packet, to obtain modulated signaling information, where the first angle is not equal to 0 degrees or 90 degrees.

According to an embodiment of the present invention, when signaling information carried in a signaling symbol in the signaling field of the data packet is being modulated, a used modulation manner may be a BPSK manner in which a phase is rotated by a preset angle. In other words, the signaling symbol in the data packet uses a modulation scheme of BPSK of rotation by a preset angle, or the signaling symbol in the data packet uses constellation diagram mapping of BPSK of rotation by a preset angle. This embodiment of the present invention imposes no limitation on the preset angle provided that the preset angle is not equal to 0 degrees or 90 degrees. For example, the preset angle may be 30 degrees, 45 degrees, 60 degrees, 120 degrees, 135 degrees, 150 degrees, or the like. For another example, the preset angle may be an angle in any quadrant in a constellation diagram.

The signaling symbol may be a signaling symbol in the signaling field of the data packet, for example, a signaling symbol in a signaling field at the $20^{th}$ μs to the $24^{th}$ μs of a PPDU frame of the data packet. This embodiment of the present invention is not limited thereto. The signaling symbol may also be, for example, a signaling symbol in a signaling field at the $24^{th}$ μs to the $28^{th}$ μs of a PPDU frame of the data packet, or a signaling symbol in a signaling field at the $20^{th}$ μs to the $28^{th}$ μs of a PPDU frame of the data packet.

The signaling field may include a plurality of signaling symbols, where each signaling symbol may carry a plurality of pieces of signaling information, that is, encoded information. For example, each signaling symbol includes a plurality of subcarriers, where signaling information carried on each subcarrier may be an information element. In this embodiment of the present invention, information element carried on each subcarrier corresponding to the at least one signaling symbol may be modulated by using the binary phase shift keying BPSK manner of rotation by the first angle. According to an embodiment of the present invention, the transmit end may modulate a plurality of signaling symbols in the signaling field by using the binary phase shift keying BPSK manner of rotation by the first angle.

Alternatively, the transmit end may also modulate a plurality of signaling symbols in the signaling field by using a mixed modulation manner. For example, the transmit end may modulate all signaling information in one signaling symbol of a plurality of signaling symbols by using the binary phase shift keying BPSK manner of rotation by the first angle (for example, 45 degrees), and modulate all signaling information in another symbol by using another modulation manner, for example, by using QBPSK, BPSK, or QPSK modulation, or a binary phase shift keying BPSK manner of rotation by a second angle (for example, 135 degrees); or, the transmit end may modulate partial signaling information in one signaling symbol of a plurality of signaling symbols by using the binary phase shift keying BPSK manner of rotation by the first angle, and modulate other partial signaling information in the signaling symbol by using another modulation manner. This embodiment of the present invention imposes no limitation on this provided that at least partial signaling information carried in the signaling field is modulated by using the binary phase shift keying BPSK manner of rotation by the first angle.

120. Send, to a receive end, the data packet that carries the modulated signaling information.

According to an embodiment of the present invention, the BPSK manner of rotation by the first angle may correspond to a corresponding data packet format, so that the receive end can detect a data packet format corresponding to the BPSK manner of rotation by the first angle.

In a Wi-Fi system, the data packet format in this embodiment of the present invention may refer to a frame format of a physical protocol data unit PPDU frame in the data packet. A modulation manner of a signaling field plays an important role in distinguishing a frame format of a data packet. For example, a BPSK modulation manner is used for a signaling field of a data packet of a legacy format, a QBPSK modulation manner is used for a signaling field of a data packet of a high throughput format, and the BPSK modulation manner and the QBPSK modulation manner are used for a signaling field of a data packet of a very high throughput format. In addition to the modulation manners, the binary phase shift keying BPSK manner of rotation by the first angle may also be used for the signaling field of the data packet in this embodiment of the present invention. If the binary phase shift keying BPSK manner of rotation by the first angle is used, a corresponding data packet format may be a frame format different from the legacy format, the high throughput format, and the very high throughput format, for example, a HEW format.

According to an embodiment of the present invention, the transmit end may modulate the signaling information carried in the signaling symbol in the signaling field of the data packet by using the binary phase shift keying BPSK manner of rotation by the preset angle. In this embodiment of the present invention, the signaling field of the data packet is modulated by using a modulation manner different from a conventional modulation manner, so that a corresponding data packet format can be effectively detected at the receive end.

According to an embodiment of the present invention, the first angle is N*45 degrees, and N is an integer not equal to 0 or 2. For example, the first angle may be 45 degrees, 135 degrees, 180 degrees, 225 degrees, 315 degrees, or the like.

Alternatively, N is an odd number; for example, the first angle may be 45 degrees, 135 degrees, 225 degrees, 315 degrees, or the like.

In 110, the transmit end may modulate all signaling information carried in one signaling symbol in the signaling field of the data packet by using a BPSK manner of rotation by 45 degrees. For example, the transmit end may modulate signaling information carried in a first signaling symbol, except a legacy signaling symbol, in the data packet by using the BPSK manner of rotation by 45 degrees. Certainly, this embodiment of the present invention is not limited thereto. The transmit end may also modulate partial signaling information carried in one signaling symbol in the signaling field of the data packet by using the BPSK manner of rotation by 45 degrees, and modulate other partial signaling information carried in the signaling symbol in the signaling field of the data packet by using another modulation manner.

In 110, the transmit end may modulate all signaling information carried in two signaling symbols in the signaling field of the data packet by using a BPSK manner of rotation by 45 degrees. For example, the transmit end may modulate signaling information carried in a first signaling symbol and a second signaling symbol, except a legacy signaling symbol, in the data packet by using the BPSK manner of rotation by 45 degrees. Certainly, this embodiment of the present invention is not limited thereto. The transmit end may also modulate partial signaling information carried in two signaling symbols in the signaling field of the data packet by using the BPSK manner of rotation by 45 degrees, and modulate other partial signaling information carried in the two signaling symbols in the signaling field of the data packet by using another modulation manner.

In 110, the transmit end may modulate, by using a BPSK manner of rotation by 45 degrees, all signaling information carried in all signaling symbols in the signaling field of the data packet.

Optionally, in another embodiment, the method shown in FIG. 1 further includes: modulating, by the transmit end, by using a BPSK manner of rotation by a second angle, signaling information carried in another signaling symbol, except the at least one signaling symbol, in the signaling field of the data packet, where the second angle is M*45 degrees, and M is an integer.

The second angle may be 0 degrees, 45 degrees, 90 degrees, 135 degrees, 180 degrees, 225 degrees, or the like. When M is 0, it is equivalent to that the preset angle is 0, that is, a used BPSK manner of rotation by 0 degrees is a conventional BPSK manner.

For example, a modulation scheme of BPSK of rotation by 45 degrees is used for a signaling symbol in a data packet, or a modulation scheme of BPSK of rotation by 135 degrees is used for a signaling symbol in a data packet, or a modulation scheme of BPSK of rotation by 225 degrees is used for a signaling symbol in a data packet, or a modulation scheme of BPSK of rotation by 315 degrees is used for a signaling symbol in a data packet.

Optionally, a (mixed) modulation scheme of BPSK of rotation by 45 degrees and BPSK of rotation by 135 degrees is used for a signaling symbol in the data packet, that is, a modulation scheme of BPSK of rotation by 45 degrees is used for partial signaling information in the signaling symbol, and a modulation scheme of BPSK of rotation by 135 degrees is used for other partial signaling information in the signaling symbol.

Optionally, a (mixed) modulation scheme of BPSK of rotation by 45 degrees and BPSK of rotation by 315 degrees is used for a signaling symbol in the data packet, that is, a modulation scheme of BPSK of rotation by 45 degrees is used for partial signaling information in a signaling symbol in the data packet, and a modulation scheme of BPSK of rotation by 315 degrees is used for other partial signaling information in the signaling symbol.

Optionally, a (mixed) modulation scheme of BPSK of rotation by 225 degrees and BPSK of rotation by 315 degrees is used for a signaling symbol in the data packet, that is, a modulation scheme of BPSK of rotation by 225 degrees is used for partial signaling information in a signaling symbol in the data packet, and a modulation scheme of BPSK of rotation by 315 degrees is used for other partial signaling information in the signaling symbol.

Optionally, a (mixed) modulation scheme of BPSK of rotation by 225 degrees and BPSK of rotation by 135 degrees is used for a signaling symbol in the data packet, that is, a modulation scheme of BPSK of rotation by 225 degrees is used for partial signaling information in a signaling symbol in the data packet, and a modulation scheme of BPSK of rotation by 135 degrees is used for other partial signaling information in the signaling symbol.

According to an embodiment of the present invention, the at least one signaling symbol is at least one orthogonal frequency division multiplexing OFDM symbol, and subcarriers corresponding to each OFDM symbol in the at least one OFDM symbol include an even-numbered subcarrier and an odd-numbered subcarrier. In 110, the transmit end may modulate, by using the BPSK manner of rotation by the first angle, first partial signaling information carried on either of the even-numbered subcarrier and the odd-numbered subcarrier.

Optionally, in another embodiment, the method shown in FIG. 1 further includes: modulating, by the transmit end, by using a BPSK manner of rotation by a second angle, second partial signaling information carried on the other one of the even-numbered subcarrier and the odd-numbered subcarrier, where the second angle is M*45 degrees, and M is an integer.

For example, an information symbol is an OFDM symbol, each OFDM symbol includes a plurality of (for example, 48) subcarrier, and each subcarrier of each OFDM symbol carries signaling information, for example, an information element. The transmit end may use the BPSK manner of rotation by the first angle for a subcarrier whose number is an odd number in the signaling field, and use the BPSK manner of rotation by the second angle for a subcarrier whose number is an even number in the signaling field. Alternatively, the transmit end may use the BPSK manner of rotation by the first angle for a subcarrier whose number is an even number in the signaling field, and use the BPSK manner of rotation by the second angle for a subcarrier whose number is an odd number in the signaling field.

According to an embodiment of the present invention, the first angle is 45 degrees, and the second angle is 0 degrees. In other words, the transmit end may modulate signaling information transmitted on either of the odd-numbered subcarrier and the even-numbered subcarrier of the at least one signaling symbol in the signaling field of the data packet by using the BPSK manner of rotation by 45 degrees. The method shown in FIG. 1 further includes: the transmit end may modulate signaling information transmitted on the other one of the odd-numbered subcarrier and the even-numbered subcarrier of the at least one signaling symbol in the signaling field of the data packet by using a conventional BPSK manner.

According to an embodiment of the present invention, the format of the data packet is a high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

For example, in a HEW system, after an symbol in a legacy signaling field L-SIG of a PPDU frame of a data packet, two signaling symbols are set: an HEW SIG A1 and an HEW SIG A2. The transmit end may modulate signaling information carried in at least one of the HEW SIG A1 and the HEW SIG A2 by using the BPSK manner of rotation by the preset angle.

According to an embodiment of the present invention, the signaling field is a signaling field in an advanced wireless system AWS, and the at least one signaling symbol is at least one of an AWS-SIG1 and an AWS-SIG2.

Figure 2:
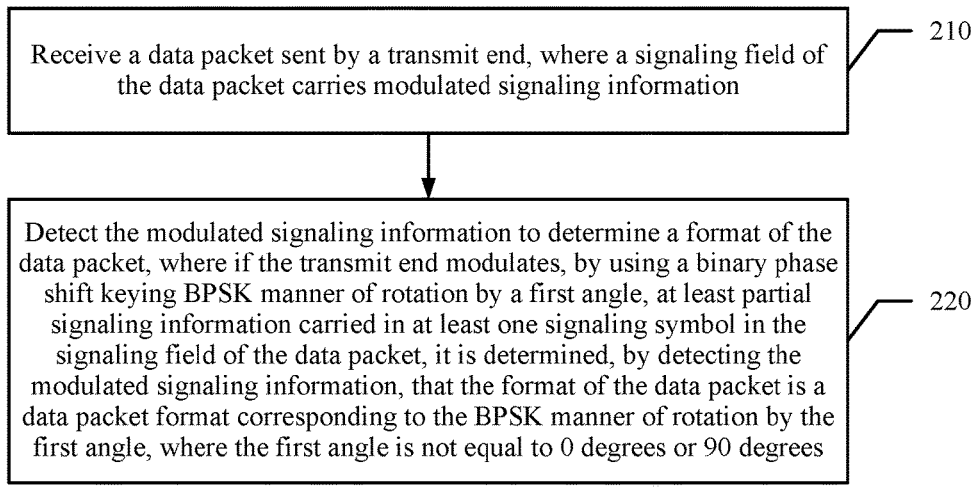
FIG. 2 is a schematic flowchart of a method for transmitting signaling according to an embodiment of the present invention.

FIG. 2 is a schematic flowchart of a method for transmitting signaling according to an embodiment of the present invention. The method shown in FIG. 2 is corresponding to the method shown in FIG. 1 and performed by a receive end (for example, UE or an access point). Detailed description is properly omitted herein. The method shown in FIG. 2 includes the following content:

210. Receive a data packet sent by a transmit end, where a signaling field of the data packet carries modulated signaling information.

220. Detect the modulated signaling information to determine a format of the data packet, where if the transmit end modulates, by using a binary phase shift keying BPSK manner of rotation by a first angle, at least partial signaling information carried in at least one signaling symbol in the signaling field of the data packet, it is determined, by detecting the modulated signaling information, that the format of the data packet is a data packet format corresponding to the BPSK manner of rotation by the first angle, where the first angle is not equal to 0 degrees or 90 degrees.

According to an embodiment of the present invention, the receive end may detect signaling information modulated by using a BPSK manner of rotation by a preset angle, to determine the format of the data packet. In this embodiment of the present invention, the signaling field of the data packet is modulated at the transmit end by using a modulation manner different from a conventional modulation manner, so that the receive end can distinguish a data packet format corresponding to such a modulation manner from a conventional data packet format.

According to an embodiment of the present invention, the first angle is N*45 degrees, and N is an integer not equal to 0 or 2. In 220, the receive end may detect a real part component and an imaginary part component of the signaling information, and compare a result of the detecting with a preset threshold, to determine the format of the data packet. For example, N may be an odd number.

For example, the preset threshold may be set according to a metric value of a real part component and an imaginary part component of the signaling information modulated by using the BPSK manner of rotation by the preset angle, and a metric value of a real part component and an imaginary part component of signaling information modulated by using a BPSK manner of rotation by 0 degrees or 90 degrees. In addition, formats of data packets that include signaling information modulated by using such two manners are distinguished according to comparison between the metric values and the preset threshold.

According to an embodiment of the present invention, the first angle is N*45 degrees, and N is an integer not equal to 0 or 2. For example, N is an odd number.

According to an embodiment of the present invention, the at least one signaling symbol is at least one OFDM symbol, and each piece of signaling information in the modulated signaling information is transmitted on a corresponding subcarrier. In 220, the receive end may multiply a real part component and an imaginary part component of modulated signaling information carried on each subcarrier corresponding to the at least one OFDM symbol to obtain at least one product, and add up the at least one product to obtain a sum of the at least one product:

$$S_{HEW} = \sum_{i=1}^{N_{SC}} (a_i * b_i),$$

where $N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compare $S_{HEW}$ with a first threshold, where the first threshold is greater than or equal to 0; and if $S_{HEW}$ is greater than the first threshold, determine that the format of the data packet is the data packet format corresponding to the binary phase shift keying manner of rotation by the first angle.

According to an embodiment of the present invention, the at least one signaling symbol is at least one OFDM symbol. In 220, the receive end may add up a square of modulated signaling information carried on each subcarrier in the at least one OFDM symbol, that is, calculate a quadratic sum of the modulated signaling information carried on the subcarriers, to obtain:

$$S = (a_s + jb_s) = \sum_{i=1}^{N_{SC}} (a_i + jb_i)^2,$$

where
$N_{SC}$ is a quantity of subcarriers carrying the modulated signaling information, $N_{SC} \geq 1$, $a_i$ is a real part component that is of the signaling information and that is carried on a subcarrier i, $b_i$ is an imaginary part component that is of the signaling information and that is carried on the subcarrier i, $a_s$ is a real part component of S, and $b_s$ is an imaginary part component of S; and determine, according to the real part component and the imaginary part component of S, that the format of the data packet is the data packet format corresponding to the binary phase shift keying manner of rotation by the first angle.

According to an embodiment of the present invention, in 220, the receive end may subtract a square of the imaginary part component of S from a square of the real part component of S to obtain:

$$S_{HEW} = a_s^2 - b_s^2;$$

compare $S_{HEW}$ with a second threshold, where the second threshold is less than or equal to 0; and if $S_{HEW}$ is less than the second threshold, determine that the format of the data packet is the data packet format corresponding to the binary phase shift keying manner of rotation by the first angle.

In 220, the receive end may square S to obtain:

$$S_{HEW} = (S)^2;$$

compare $S_{HEW}$ with the second threshold, where the second threshold is less than or equal to 0; and if $S_{HEW}$ is less than the second threshold, determine that the format of the data packet is the data packet format corresponding to the binary phase shift keying manner of rotation by the first angle.

In 220, the receive end may compare the real part component of S with the imaginary part component of S; and determine, according to a result of comparison between the real part component and the imaginary part component, whether the format of the data packet is the data packet format corresponding to the binary phase shift keying manner of rotation by the first angle. Specifically, reference may be made to the embodiment in FIG. 13, and details are not described herein again.

According to an embodiment of the present invention, the at least one signaling symbol is at least one OFDM symbol. In 220, the receive end may subtract a square of an imaginary part component of modulated signaling information carried on each subcarrier corresponding to the at least one OFDM symbol from a square of a real part component of the modulated signaling information carried on each subcarrier co to obtain at least one difference, and add up the at least one difference to obtain a sum of the at least one difference:

$$S = \sum_{i=1}^{N_{SC}} (a_i^2 - b_i^2),$$

where
$N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compare S with a first range, where the first range is a subinterval of an open interval $(-N_{SC}, N_{SC})$; and if S is in the first range, determine that the format of the data packet is the data packet format corresponding to the binary phase shift keying manner of rotation by the first angle.

For example, the first range may be an interval near 0, or may even be 0.

Optionally, in another embodiment, the method shown in FIG. 2 further includes: if the transmit end modulates at least partial signaling information carried in at least one signaling symbol in the signaling field of the data packet by using a second modulation manner, the receive end may compare S with a second range, where the second range is a subinterval of the open interval $(-N_{SC}, N_{SC})$; if S is in the second range, the receive end may determine that the format of the data packet is a data packet format corresponding to the second modulation manner, where the second range is different from the first range, the second modulation manner is BPSK corresponding to a legacy format, QBPSK corresponding to an HT format, or BPSK and QBPSK corresponding to a VHT format.

According to an embodiment of the present invention, the at least one OFDM symbol includes a first OFDM symbol and a second OFDM symbol, S obtained for the first OFDM symbol is $S_1$, and S obtained for the second OFDM symbol is and $S_2$; and
when $$\begin{cases} S_1 < -N_{SC}/2 \\ S_2 < -N_{SC}/2 \end{cases},$$

it is determined that the format of the received data packet is the HT format; or
when $$\begin{cases} S_1 > N_{SC}/2 \\ S_2 < -N_{SC}/2 \end{cases},$$

it is determined that the format of the data packet is the VHT format; or
when $$\begin{cases} -N_{SC}/2 < S_1 < N_{SC}/2 \\ -N_{SC}/2 < S_2 < N_{SC}/2 \end{cases},$$

it is determined that the format of the data packet is a HEW format.

Alternatively, in another embodiment, the at least one signaling symbol includes a first OFDM symbol and a second OFDM symbol. In 220, the receive end may detect a real part component and an imaginary part component of signaling information carried in the first signaling symbol to obtain a first detection result or a first metric value; compare the first detection result with a third threshold, where the third threshold is greater than 0; if the first detection result is greater than the third threshold, detect a real part component and an imaginary part component of signaling information carried in the second signaling symbol to obtain a second detection result or a second metric value; compare the second detection result with the third threshold; if the second detection result is greater than the third threshold, determine that the format of the data packet is a legacy format, or if the second detection result is not greater than the third threshold, determine that the format of the data packet is the VHT format; if the first detection result is not greater than the third threshold, compare the first detection result with a fourth threshold; and if the first detection result is less than the fourth threshold, determine that the format of the data packet is the HT format, or if the first detection result is not less than the fourth threshold, determine that the format of the data packet is the HEW format, where the fourth threshold is less than 0.

For example, the at least one signaling symbol includes a first OFDM symbol and a second OFDM symbol, S obtained for the first OFDM symbol is $S_1$, and S obtained for the second OFDM symbol is $S_2$; if $S_1$ is greater than the third threshold and $S_2$ is greater than the third threshold, it is determined that the format of the data packet is a legacy format; or if $S_1$ is greater than a third threshold and $S_2$ is less than a fourth threshold, it is determined that the format of the data packet is the VHT format; or if $S_1$ is less a fourth threshold and $S_2$ is less than the fourth threshold, it is determined that the format of the data packet is the HT format; or if $S_1$ is less a third threshold and $S_1$ is greater than a fourth threshold, and, $S_2$ is less the third threshold and $S_2$ is greater than the fourth threshold, it is determined that the format of the data packet is the HEW format; where the third threshold is greater than 0, and the fourth threshold is less than 0.

According to an embodiment of the present invention, the first detection result and the second detection result are obtained from the following formula:

$$S = \sum_{i=1}^{N_{SC}} (a_i^2 - b_i^2),$$

where $N_{SC}$ is the quantity of subcarriers carrying the modulated signaling information, $N_{SC} \geq 1$, $a_i$ is the real part component that is of the modulated signaling information and that is carried on the subcarrier i, and $b_i$ is the imaginary part component that is of the modulated signaling information and that is carried on the subcarrier i.

According to an embodiment of the present invention, the at least one signaling symbol is at least one OFDM symbol, subcarriers in the OFDM symbol include an even-numbered subcarrier and an odd-numbered subcarrier, a signaling symbol carried on either of the odd-numbered subcarrier and the even-numbered subcarrier is modulated by using the binary phase shift keying manner of rotation by the first angle, and a signaling symbol carried on the other one of the odd-numbered subcarrier and the even-numbered subcarrier is modulated by using a binary phase shift keying manner of rotation by a second angle, where the second angle is M*45 degrees, and M is an integer.

According to an embodiment of the present invention, the format of the data packet is the high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L-SIG symbol in the PPDU frame.

According to an embodiment of the present invention, the signaling field is a signaling field in an advanced wireless system AWS, and the at least one signaling symbol is at least one of an AWS-SIG1 and an AWS-SIG2.

Figure 3:
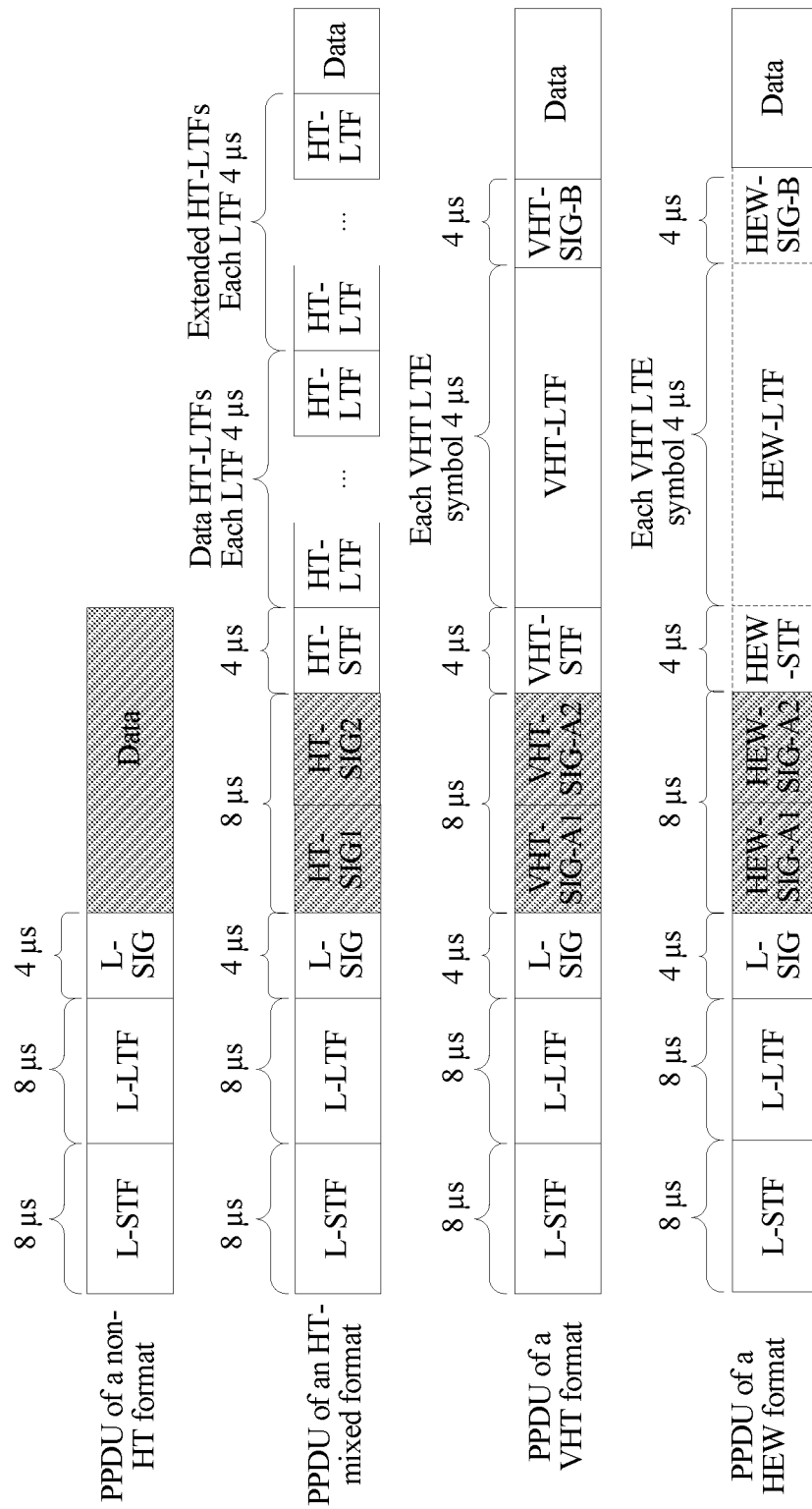
FIG. 3 is a schematic diagram of a frame format of a data packet according to an embodiment of the present invention.

FIG. 3 is a schematic diagram of a frame format of a data packet according to an embodiment of the present invention.

Referring to FIG. 3, a frame format of a PPDU of a data packet may include a legacy format, an HT-mixed format, a VHT format, and a HEW format. An L-STF of 8 μs, an L-LTF of 8 μs, and an L-SIG of 4 μs are successively set in each of PPDUs of the foregoing formats at the $0^{th}$ μs to the $20^{th}$ μs. Data is set for a PPDU of a Non-HT format at the $20^{th}$ μs to the $28^{th}$ μs. Signaling symbols HT-SIG1 and HT-SIG2 are set for a PPDU of the HT-mixed format in a signaling field at the $20^{th}$ μs to the $28^{th}$ μs. Signaling symbols VHT-SIG A1 and VHT-SIG A2 are set for a PPDU of a VHT-mixed format in a signaling field at the $20^{th}$ μs to the $28^{th}$ μs. Signaling symbols HEW-SIG A1 and HEW-SIG A2 are set for a PPDU of the HEW format in a signaling field at the $20^{th}$ μs to the $28^{th}$ μs.

Data packets of different Wi-Fi systems may have different frame formats, and a frame format of a data packet may be corresponding to a modulation manner of signaling information carried in a signaling symbol in a signaling field of the data packet. For example, both signaling information carried in an HT-SIG1 and signaling information carried in an HT-SIG2 are modulated by using a QBPSK manner; signaling information carried in a VHT-SIG-A1 is modulated by using a BPSK manner; signaling information carried in a VHT-SIG-A2 is modulated by using a QBPSK manner. Data of a PPDU of a legacy format at the $20^{th}$ μs to the $28^{th}$ μs is modulated by using a manner such as BPSK or QPSK. The HEW-SIG A1 and/or the HEW-SIG A2 may be modulated by using a BPSK manner of rotation by a preset angle.

Figure 4:
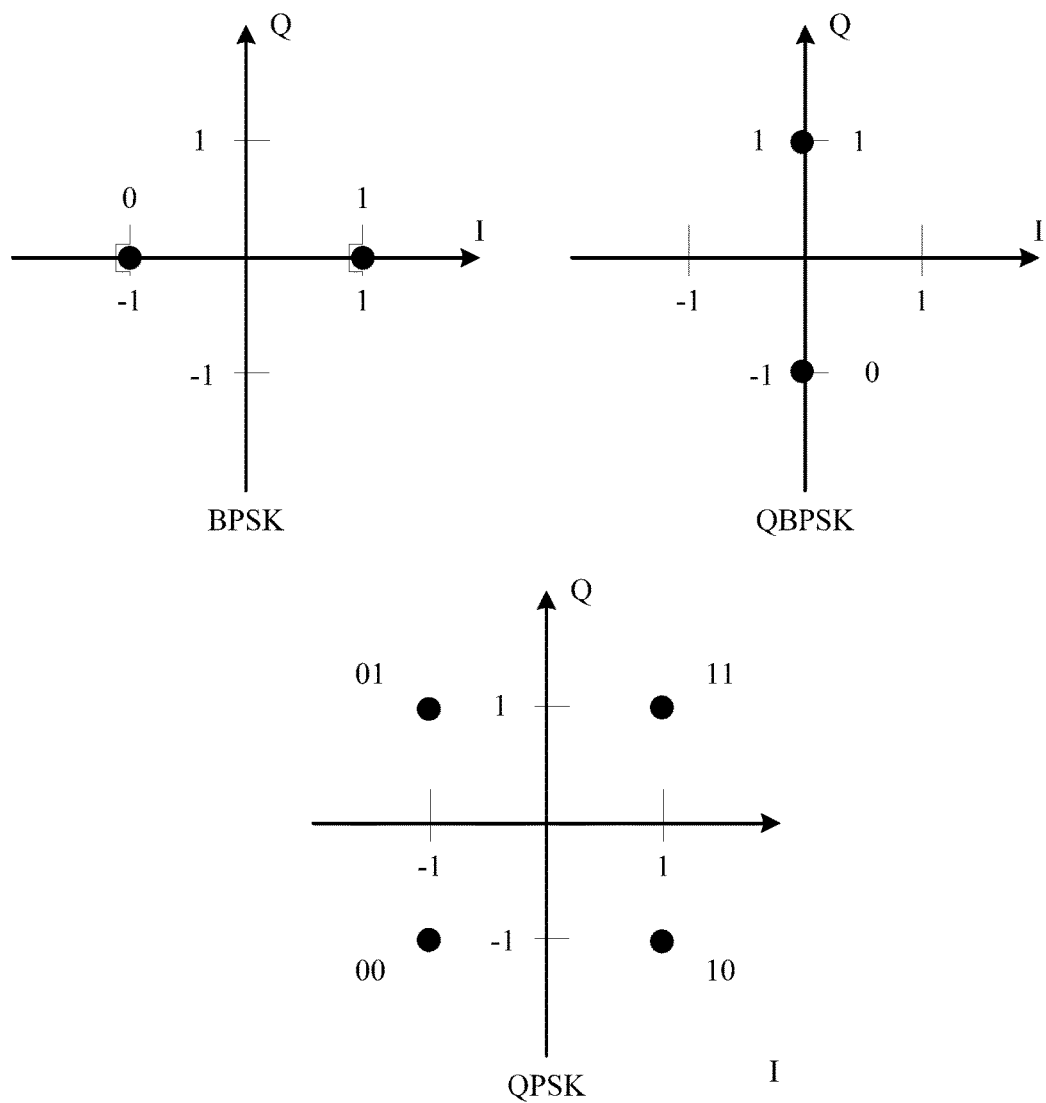
FIG. 4 is a schematic diagram of constellation diagrams of three conventional modulation manners.

FIG. 4 is a schematic diagram of constellation diagrams of three conventional modulation manners.

Referring to FIG. 4, for BPSK, an information element 0 is mapped to a point (−1,0) on a real axis (I axis), and an information element 1 is mapped to a point (+1,0) on the real axis. For QBPSK, the information element 0 is mapped to a point (−1,0) on an imaginary axis (Q axis), and the information element 1 is mapped to a point (+1,0) on the imaginary axis. For QPSK, an information element 11 is mapped to a point (+1,+1) in a first quadrant, an information element 01 is mapped to a point (−1,+1) in a second quadrant, an information element 00 is mapped to a point (−1,−1) in a third quadrant, and an information element 10 is mapped to a point (+1,−1) in a fourth quadrant.

Figure 5:
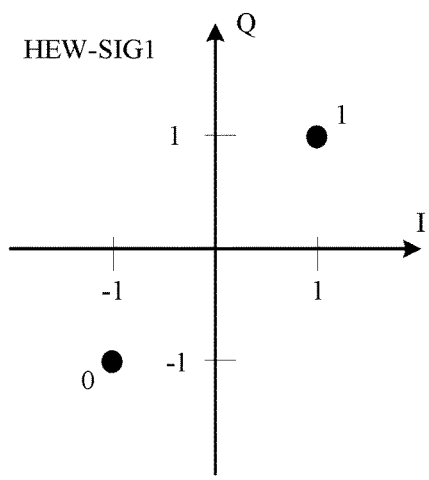
FIG. 5 is a schematic diagram of constellation diagrams of four modulation manners according to an embodiment of the present invention.
Figure 5:
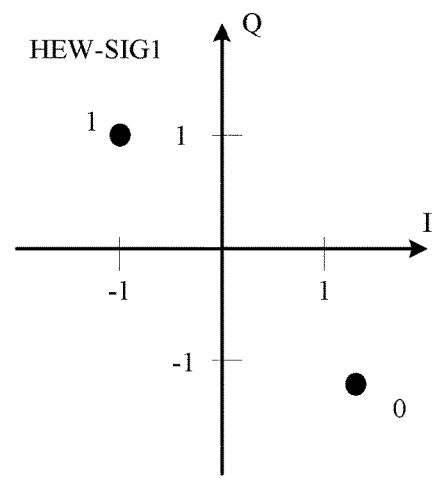
Figure 5:
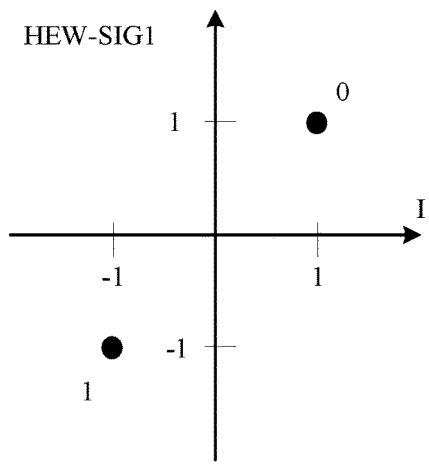
Figure 5:
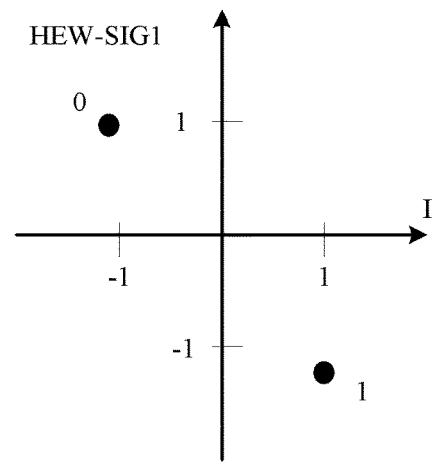

FIG. 5 is a schematic diagram of constellation diagrams of four modulation manners according to an embodiment of the present invention.

Referring to FIG. 5, for a BPSK manner of rotation by 45 degrees, an information element 0 is mapped to a point (−1,−1) in a third quadrant, and an information element 1 is mapped to a point (+1,+1) in a first quadrant. That is, compared with BPSK, a phase is rotated by 45 degrees. For a BPSK manner of rotation by 135 degrees, the information element 0 is mapped to a point (+1,−1) in a fourth quadrant, and the information element 1 is mapped to a point (−1,+1) in a second quadrant. That is, compared with BPSK, the phase is rotated by 135 degrees. For a BPSK manner of rotation by 225 degrees, the information element 0 is mapped to the point (+1,+1) in the first quadrant, and the information element 1 is mapped to the point (−1,−1) in the third quadrant. That is, compared with BPSK, the phase is rotated by 225 degrees. For a BPSK manner of rotation by 315 degrees, the information element 0 is mapped to the point (−1,+1) in the second quadrant, and the information element 1 is mapped to the point (+1,−1) in the fourth quadrant. That is, compared with BPSK, the phase is rotated by 315 degrees.

Figure 6:
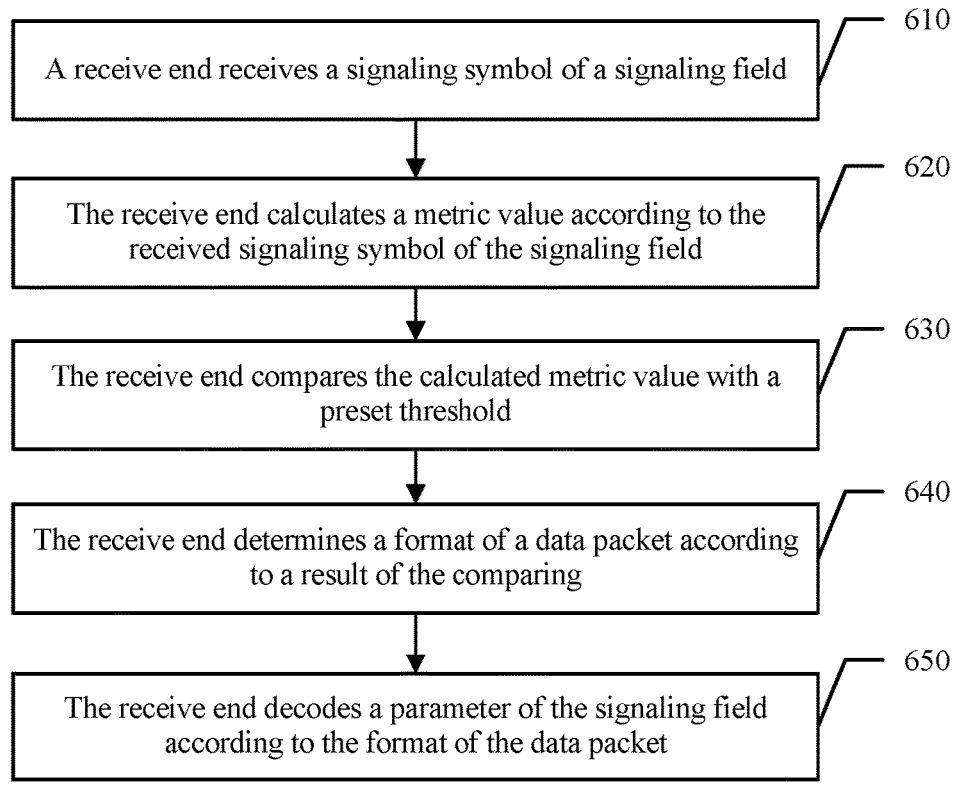
FIG. 6 is a schematic diagram of a process of detecting a data packet format according to an embodiment of the present invention.
Figure 7:
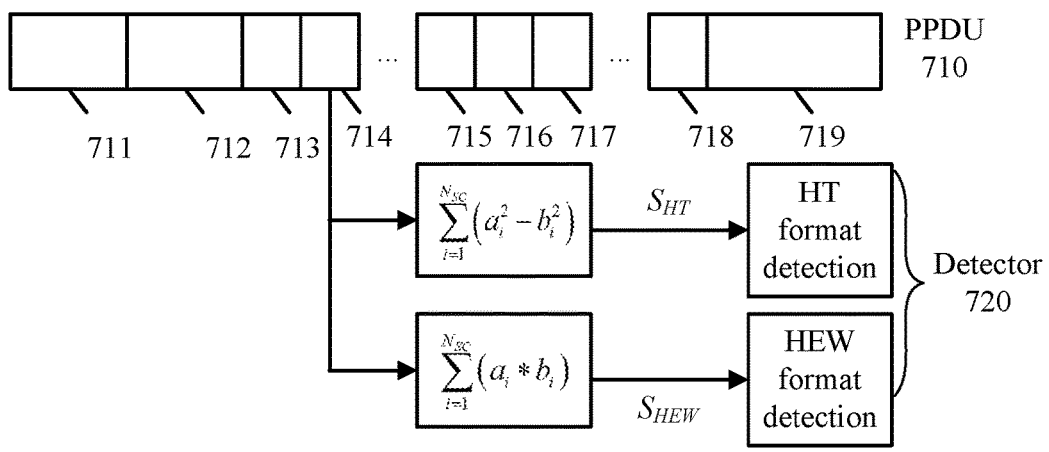
FIG. 7 is a schematic diagram of performing format detection on a data packet by using a detector according to an embodiment of the present invention.

FIG. 6 is a schematic diagram of a process of detecting a data packet format according to an embodiment of the present invention. FIG. 7 is a schematic diagram of performing format detection on a data packet by using a detector according to an embodiment of the present invention.

Referring to FIG. 7, a PPDU 710 of a data packet includes a legacy short training field L-STF 711, a long training field L-LTF 712, a legacy signal field L-SIG 713, signaling fields x-SIG-1 714 to x-SIG-n 715, a short training field x-STF 716, a long training field x-LTF 717 to a long training field 718, and a data field 719; where x may represent a format of data, for example, an x-SIG-1 may be an HT-STG-1 or an HEW-SIG-1. In this embodiment, when a format of the data packet is a HEW format, signaling information in the x-SIG-1 may be modulated by using a BPSK manner of rotation by 45 degrees at a transmit end.

This embodiment of the present invention is not limited thereto. Arrangements or layouts of fields included in the PPDU 710 may use another manner. For example, in another embodiment, the signaling fields x-SIG-1 714 to x-SIG-n 715 may be replaced with signaling fields x-SIG-A1 714 to x-SIG-An 715, and signaling fields x-SIG and/or x-SIG-B1 to x-SIG-Bn may be inserted between the x-SIG-An 715 and the data field 719. For example, the x-SIG and the x-SIG-B1 to the x-SIG-Bn may be successively inserted between the x-LTF 718 and the data field 719.

The detector 720 may detect a metric value or a measurable indicator of signaling information carried in at least one of the signaling fields x-SIG-1 714 to x-SIG-n 715 (for example, a signaling field at the 20$^{th}$ μs to the 24$^{th}$ μs of the data packet) by using a corresponding detection algorithm, and determine, according to the metric value or the measurable indicator, that the data packet is the HEW format or another format (for example, an HT format).

The following describes, with reference to FIG. 6, how to determine the format of the data packet by detecting signaling information at a time position (that is, the x-SIG-1) of the 20$^{th}$ μs to the 24$^{th}$ μs of the data packet.

610. A receive end receives a signaling symbol of a signaling field.

For example, each signaling field may include a plurality of subcarriers that are used to transmit signaling information. For example, in IEEE 802.11a, there are 48 subcarriers in each signaling symbol that are used to transmit signaling information. In IEEE 802.11n, when transmission bandwidth is 20 MHz, there are 52 subcarriers in each signaling symbol that are used to transmit signaling information. Within a time of each signaling field, one information element can be transmitted on each subcarrier.

620. The receive end calculates a metric value according to the received signaling symbol of the signaling field.

A new measurement method is used in this embodiment of the present invention: multiplying a real part component and an imaginary part component of signaling information (that is, an information element) transmitted on each subcarrier in one signaling symbol (which is the x-SIG-1 in this embodiment) in the signaling field, and then adding up a product that is obtained for each subcarrier to obtain the following operation result:

$$S_{HEW} = \sum_{i=1}^{N_{SC}} (a_i * b_i),$$

where
$N_{SC}$ is a quantity of subcarriers carrying the signaling information, $a_i$ is a real part component of signaling information on a subcarrier i, and $b_i$ is an imaginary part component of the signaling information on the subcarrier i.

If the data packet is a data packet of the HT format, an HT-SIG-1 is sent at this time position. Signaling information carried on the HT-SIG-1 is modulated by using a QBPSK manner, that is, $a_i$=0, i=1, ..., $N_{SC}$. Therefore, $S_{HEW}$=0 is obtained.

If the data packet is a data packet of a VHT format, a VHT-SIG-A1 is sent at this time position. Signaling information carried on the VHT-SIG-A1 is modulated by using a BPSK manner, that is $b_i$=0,i=1, ..., $N_{SC}$. Therefore, $S_{HEW}$=0 is obtained.

If the data packet is of a legacy format, a signal of a data field is sent at this time position. The signal of the data field may be modulated by using a BPSK, QPSK, or QAM manner. If the signal of the data field is modulated by using the BPSK manner, $S_{HEW}$=0 is obtained. If the signal of the data field is modulated by using QPSK, the following operation result is obtained:

$$P(a_i = 0.707, b_i = 0.707) = 0.25, i = 1, 2, ..., N_{SC}$$
$$P(a_i = -0.707, b_i = 0.707) = 0.25, i = 1, 2, ..., N_{SC}$$
$$P(a_i = -0.707, b_i = -0.707) = 0.25, i = 1, 2, ..., N_{SC}$$
$$P(a_i = 0.707, b_i = -0.707) = 0.25, i = 1, 2, ..., N_{SC}$$

$$a_i * b_i = \begin{cases} 0.5, p = 0.5 \\ -0.5, p = 0.5 \end{cases}, i = 1, 2, ..., N_{SC}$$

$$S_{HEW} = \sum_{i=1}^{N_{SC}} (a_i * b_i) = 0.5 * 0.5 + (-0.5) * 0.5 = 0$$

Because the signal of the data field is distributed in a relatively random manner, the signal of the data field is evenly distributed among four points in a QPSK constellation diagram. If probabilities of all points are the same, a probability of each point is 0.25. Likewise, if the signal of the data field is modulated by using the QAM manner, a similar result may also be obtained. If the signal of the data field is distributed in a random manner, the obtained operation result is 0. In an actual process, in a QPSK or QAM constellation diagram, it is likely that the signal of the data field is mapped a little more frequently to a particular point. In this case, the obtained operation result may not be always 0 but should be a number close to 0. Therefore, a subsequent decision on a data packet format is not affected.

If the format of the data packet is the HEW format, a HEW-SIG-A1 is sent at this time position. A modulation manner used for the HEW-SIG-A1 is BPSK of rotation by 45 degrees, and the following operation formulas are obtained:

$$P(a_i = 0.707, b_i = 0.707) + P(a_i = -0.707, b_i = -0.707) = 1,$$
$$i = 1, 2, \ldots, N_{SC}$$
$$P(a_i * b_i = 0.5) = 1, i = 1, 2, \ldots, N_{SC}$$
$$S_{HEW} = \sum_{i=1}^{N_{SC}} (a_i * b_i) = \frac{N_{SC}}{2}$$

In conclusion, the detector has two possible outputs: 0, or a larger positive number compared with 0, for example, $$\frac{N_{SC}}{2},$$

as shown in Table 1.

TABLE 1

Output result of a HEW detector

|  | HT-SIG | VHT-SIG-A1 | L-Data |  | HEW-SIG |
|---|---|---|---|---|---|
| Modulation manner | QBPSK | BPSK | BPSK | QPSK | BPSK of rotation by 45 degrees |
| $S_{HEW}$ | 0 | 0 | 0 | 0 | $\frac{N_{SC}}{2}$ |

630. The receive end compares the calculated metric value with a preset threshold.

For example, an output result (that is, the calculated metric value) of the detector can be compared with the preset threshold. For example, a threshold $N_{SC}/4$ may be set for $S_{HEW}$, and the calculated metric value is compared with the threshold according to a possible output result of a HEW detector.

640. The receive end determines the format of the data packet according to a result of the comparing.

A format of a received data packet is determined according to the result of comparison between the metric value and the threshold. For example, when the operation result $S_{HEW}$ exceeds the set threshold, $N_{SC}/4$, it can be determined that the received data packet is a data packet of the HEW format.

It should be noted that when the threshold is being set, considerations may be given to both a missing detection rate and an incorrect detection rate, that is, the threshold may be set according to the missing detection rate and the incorrect detection rate. The missing detection rate refers to a probability at which a data packet of a HEW format is sent but the data packet of the HEW format is not obtained by detection. The incorrect detection rate refers to a probability at which a data packet of a legacy format, a data packet of an HT format, or a data packet of a VHT format is sent but it is determined, according to a detection result, that the data packet is a HEW format. If the missing detection rate needs to be lowered, a set threshold can be lowered; if the incorrect detection rate needs to be lowered, the set threshold can be improved.

650. The receive end decodes a parameter of the signaling field according to the format of the data packet.

A data packet of each format may carry a different parameter in a signaling field. Therefore, after the format of the data packet is determined, the parameter of the signaling field can be decoded according to the format.

The measurement method in this embodiment of the present invention is easy to be implemented at a receive end, and is simple and practical. In addition, a data packet of a HEW format can be accurately distinguished from a data packet (for example, a data packet of a legacy format, a data packet of an HT format, or a data packet of a VHT format) of another format.

Figure 8:
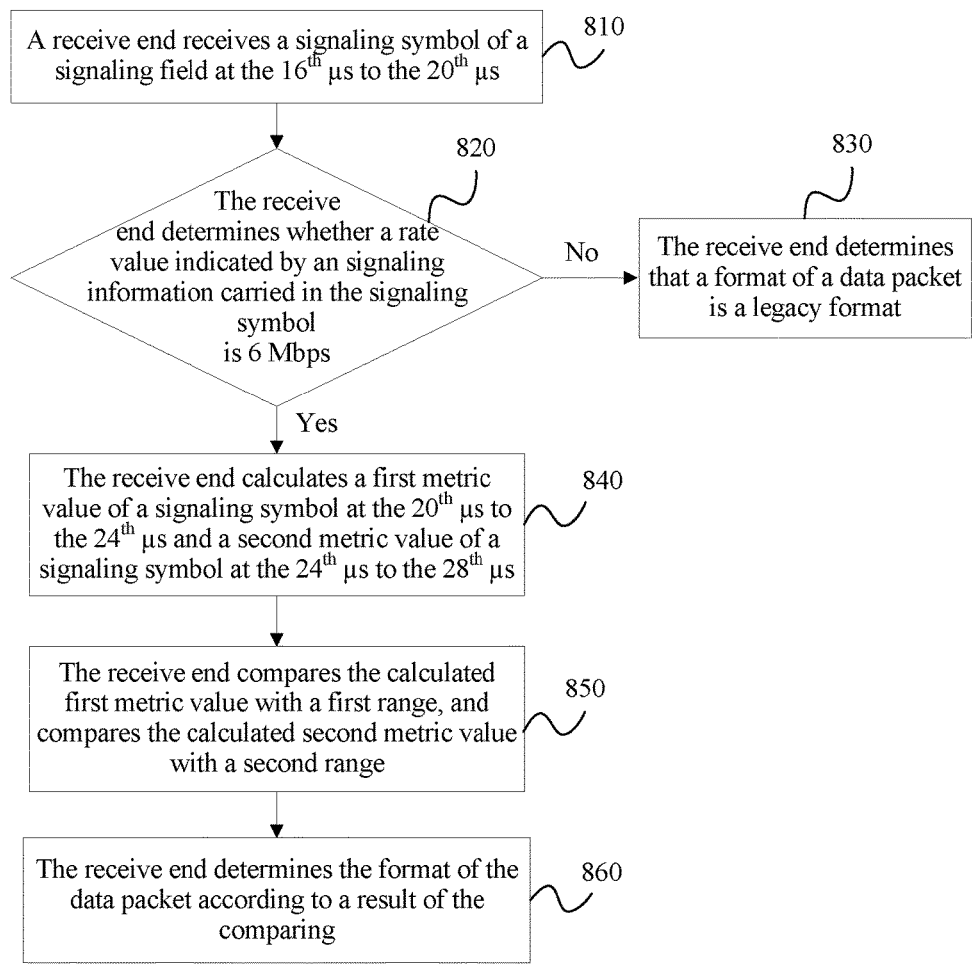
FIG. 8 is a schematic diagram of a process of detecting a data packet format according to another embodiment of the present invention.
Figure 9:
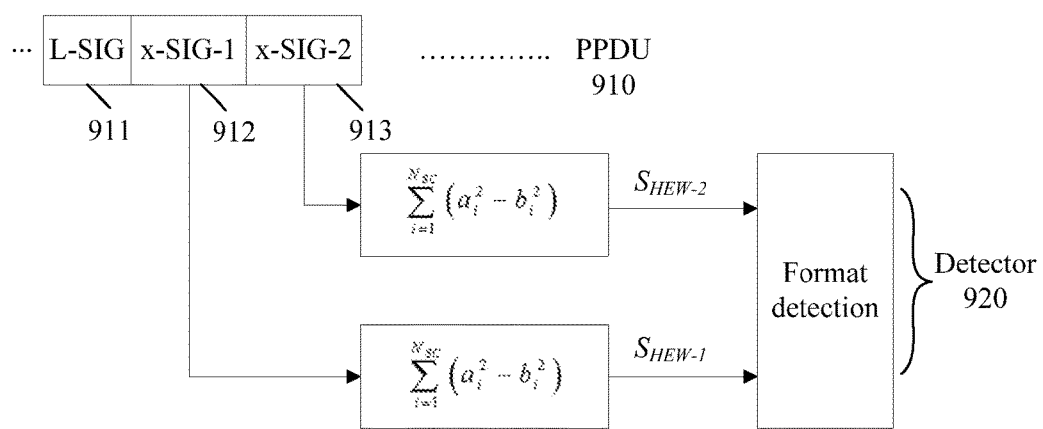
FIG. 9 is a schematic diagram of performing format detection on a data packet by using a detector according to an embodiment of the present invention.

FIG. 8 is a schematic diagram of a process of detecting a data packet format according to another embodiment of the present invention. FIG. 9 is a schematic diagram of performing format detection on a data packet by using a detector according to an embodiment of the present invention.

Referring to 9, a PPDU 910 of a data packet may include a short training field (not shown), a long training field (not shown), a legacy signal field L-SIG 911, signaling fields x-SIG-1 912 and x-SIG-2 913, and a data field (not shown), where x may represent a format of the data packet, for example, x-SIG-1 may be an HT-STG-1 or an HEW-SIG-1, and an x-SIG-2 may be an HT-SIG-2 or an HEW-SIG-2. In this embodiment, when a format of the data packet is a HEW format, signaling information carried in the x-SIG-1 and the x-SIG-2 may be modulated by using a BPSK manner of rotation by 45 degrees at a transmit end.

The detector 920 may detect a metric value or a measurable indicator of signaling information carried in the signaling fields x-SIG-1 912 to x-SIG-2 913 (for example, a signaling field at the $20^{th}$ μs to the $28^{th}$ μs of the data packet) by using a detection algorithm, and determine, according to the metric value or the measurable indicator, that the data packet is of a legacy format, an HT format, a VHT format, or the HEW format.

The following describes how to determine the format of the data packet by detecting signaling information at a time position of the $20^{th}$ μs to the $24^{th}$ μs (the x-SIG-1) of the PPDU frame of the data packet and signaling information at a time position of the $24^{th}$ μs to the $28^{th}$ μs (the x-SIG-2) of the PPDU frame of the data packet.

810. A receive end receives a signaling symbol at the $16^{th}$ μs to the $20^{th}$ μs of the PPDU frame of the data packet.

In a Wi-Fi system, a signaling symbol at the $16^{th}$ μs to the $20^{th}$ μs of a PPDU frame of a data packet is a L-SIG symbol, where the first four bits of the L-SIG symbol are used to represent a rate of a signaling symbol at the $20^{th}$ μs to the $28^{th}$ μs of the PPDU frame.

820. The receive end determines whether a rate value indicated by signaling information carried in the signaling symbol is 6 Mbps.

If the receive end determines that the rate value indicated by the signaling information carried in the signaling symbol at the $16^{th}$ μs to the $20^{th}$ μs is 6 Mbps, 840 is performed; if the receive end determines that the rate value indicated by the signaling information carried in the signaling symbol at the $16^{th}$ μs to the $20^{th}$ μs is not 6 Mbps, 830 is performed.

If the rate value is 6 Mbps, the format of the data packet may be a legacy format, an HT format, a VHT format, or a HEW format. If the rate value is not 6 Mbps, the format of the data packet cannot be the HT format, the VHT format, or the HEW format but can be only the legacy format.

830. If the rate value indicated by the signaling information carried in the signaling symbol at the $16^{th}$ μs to the $20^{th}$ μs is not equal to 6 Mbps, the receive end determines that the format of the data packet is a legacy format.

840. The receive end calculates a first metric value of a signaling symbol at the $20^{th}$ μs to the $24^{th}$ μs and a second metric value of a signaling symbol at the $24^{th}$ μs to the $28^{th}$ μs.

For example, the receive end calculates a first metric value of signaling information carried in a signaling symbol at the $20^{th}$ μs to the $24^{th}$ μs of the PPDU frame of the data packet and a second metric value of signaling information carried in a signaling symbol at the $24^{th}$ μs to the $28^{th}$ μs of the PPDU frame of the data packet.

For each signaling symbol in the signaling symbols x-SIG-1 and x-SIG-2, the following measurement method can be used. The measurement method in this embodiment is: first, subtracting energy (a square of an imaginary part) of the imaginary part from energy (a square of a real part) of the real part component of a signal on each subcarrier of the signaling symbol, and then adding up a difference obtained for each subcarrier, to obtain the following operation result:

$$S = \sum_{i=1}^{N_{SC}} (a_i^2 - b_i^2),$$

where $N_{SC}$ is a quantity of subcarriers carrying the signaling information, $a_i$ is a real part component of signaling information on a subcarrier i, and $b_i$ is an imaginary part component of the signaling information on the subcarrier i.

Referring to FIG. 9, the detection algorithm is performed at both the $20^{th}$ μs to the $24^{th}$ μs and the $24^{th}$ μs to the $28^{th}$ μs of the received data packet, to calculate two metric values.

If the format of the data packet is the HT format, an HT-SIG1 and an HT-SIG2 are sent at the $20^{th}$ μs to the $28^{th}$ μs of the data packet. Both the two signaling symbols are modulated by using a QBPSK manner, and the following operation result is obtained:

$$a_i = 0, i = 1, \ldots, N_{SC}$$

$$S_1 = \sum_{i=1}^{N_{SC}} (a_i^2 - b_i^2) = -N_{SC}$$

$$S_2 = \sum_{i=1}^{N_{SC}} (a_i^2 - b_i^2) = -N_{SC}$$

If the format of the data packet is the VHT format, a VHT-SIG-A1 and a VHT-SIG-A2 are sent at the $20^{th}$ μs to the $28^{th}$ μs of the data packet. The VHT-SIG-A1 is modulated by using the BPSK manner, and the following operation result is obtained:

$$b_i = 0, i = 1, \ldots, N_{SC}$$

$$S_1 = \sum_{i=1}^{N_{SC}} (a_i^2 - b_i^2) = N_{SC}$$

The VHT-SIG-A2 is modulated by using the QBPSK manner, and the following operation result is obtained:

$$a_i = 0, i = 1, \ldots, N_{SC}$$

$$S_2 = \sum_{i=1}^{N_{SC}} (a_i^2 - b_i^2) = -N_{SC}$$

If the format of the data packet is a legacy format, a data field is sent at the $20^{th}$ μs to the $28^{th}$ μs of the data packet. The data field is modulated by using the BPSK manner. Because for the data packet of the legacy format, a rate value in the L-SIG is 6 Mbps at the $20^{th}$ μs to the $28^{th}$ μs only when a signal is modulated by using BPSK. The rate value in the L-SIG is not 6 Mbps when another modulation manner is used. Therefore, it is only required to determine a case in which a signal modulated by using BPSK is sent at the $20^{th}$ μs to the $28^{th}$ μs. The following operation result is obtained:

$$b_i = 0, i = 1, \ldots, N_{SC}$$

$$S_1 = \sum_{i=1}^{N_{SC}} (a_i^2 - b_i^2) = N_{SC}$$

$$S_2 = \sum_{i=1}^{N_{SC}} (a_i^2 - b_i^2) = N_{SC}$$

If the format of the data packet is the HEW format, a HEW-SIG-A1 and a HEW-SIG-A2 are sent at the $20^{th}$ μs to the $28^{th}$ μs of the data packet. A used modulation manner is BPSK of rotation by 45 degrees for both the HEW-SIG-A1 and the HEW-SIG-A2, and the following operation result is obtained:

$$P(a_i = 0.707, b_i = 0.707) + P(a_i = -0.707, b_i = -0.707) = 1,$$

$$i = 1, 2, \ldots, N_{SC}$$

$$P(a_i^2 - b_i^2 = 0) = 1, i = 1, 2, \ldots, N_{SC}$$

$$S_1 = \sum_{i=1}^{N_{SC}} (a_i^2 - b_i^2) = 0$$

$$S_2 = \sum_{i=1}^{N_{SC}} (a_i^2 - b_i^2) = 0$$

In conclusion, the detector has four possible outputs, as shown in Table 2.

TABLE 2

Output result of an IEEE 802.11 format detector

| Data packet format | Modulation manner | | Output of a detector | |
| --- | --- | --- | --- | --- |
| | 20 μs~24 μs | 24 μs~28 μs | $S_1$ | $S_2$ |
| Legacy | BPSK | BPSK | $N_{SC}$ | $N_{SC}$ |
| HT | QBPSK | QBPSK | $-N_{SC}$ | $-N_{SC}$ |
| VHT | BPSK | QBPSK | $N_{SC}$ | $-N_{SC}$ |
| HEW | BPSK of rotation by 45 degrees | BPSK of rotation by 45 degrees | 0 | 0 |

It may be learned from Table 2 that the detector has four different outputs for four different data packet formats. Therefore, the format of the data packet can be accurately determined according to a detection result.

850. The receive end compares the calculated first metric value with a first range, and compares the calculated second metric value with a second range.

According to an output result of the detector, thresholds can be set respectively for time segments of the $20^{th}$ μs to the $24^{th}$ μs and the $24^{th}$ μs to the $28^{th}$ μs. For example, two are set for $S_1$: $N_{SC}/2$ and $-N_{SC}/2$; two thresholds are also set for $S_2$: $N_{SC}/2$ and $-N_{SC}/2$. The first range and the second range can be determined according to these thresholds.

860. Determine the format of the data packet according to results of the comparing.

The format of the received data packet is determined according to the results of comparison between the metric values and the thresholds. For example, when the operation result meets a range of $$\begin{cases} S_1 < -N_{SC}/2 \\ S_2 < -N_{SC}/2 \end{cases},$$

it can be determined that the format of the received data packet is the HT format. For example, when the operation result meets a range of $$\begin{cases} S_1 > N_{SC}/2 \\ S_2 < -N_{SC}/2 \end{cases},$$

it can be determined that the format of the received data packet is the VHT format. When the operation result meets a range of $$\begin{cases} -N_{SC}/2 < S_1 < N_{SC}/2 \\ -N_{SC}/2 < S_2 < N_{SC}/2 \end{cases},$$

it can be determined that the format of the received data packet is the HEW format.

Figure 10:
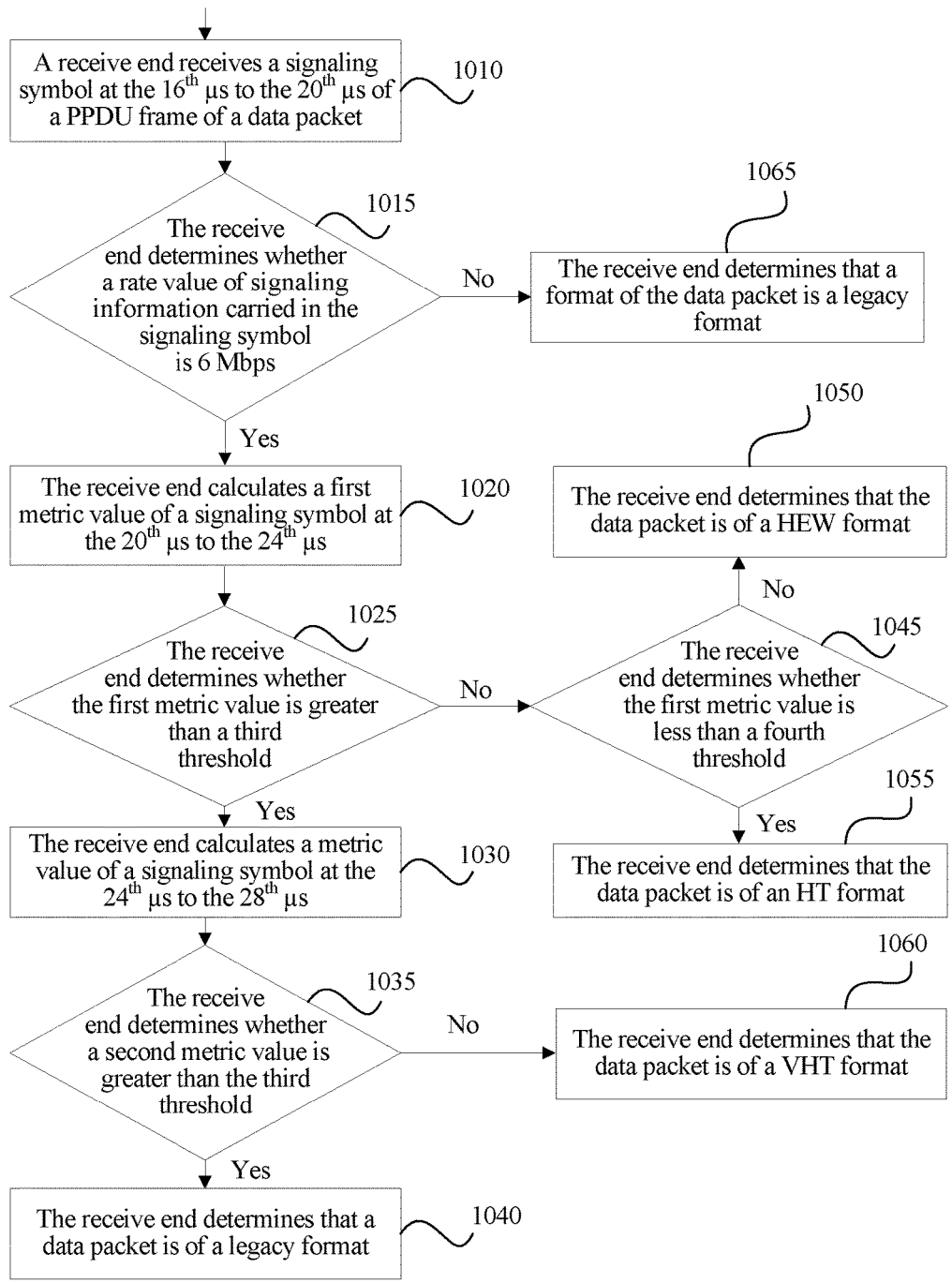
FIG. 10 is a schematic flowchart of performing format detection on a data packet according to another embodiment of the present invention.

FIG. 10 is a schematic flowchart of performing format detection on a data packet according to another embodiment of the present invention.

In this embodiment, a PPDU of a data packet is the same as the PPDU of the data packet in the embodiment in FIG. 9. When a format of the data packet is a HEW format, signaling information in an x-SIG-1 and an x-SIG-2 may be modulated by using a BPSK manner of rotation by 45 degrees at a transmit end.

Referring to FIG. 9, the detector 920 may detect a metric value or a measurable indicator of signaling information carried in signaling fields x-SIG-1 912 to x-SIG-2 913 (for example, a signaling field at the $20^{th}$ μs to the $28^{th}$ μs of the data packet) by using a detection algorithm, and determine, according to the metric value or the measurable indicator, that the data packet is of a legacy format, an HT format, a VHT format, or a HEW format.

The following describes how to determine the format of the data packet by detecting signaling information at a time position of the $20^{th}$ μs to the $24^{th}$ μs (the x-SIG-1) of a PPDU frame of the data packet and signaling information at a time position of the $24^{th}$ μs to the $28^{th}$ μs (the x-SIG-2) of the PPDU frame of the data packet.

1010. A receive end receives a signaling symbol at the $16^{th}$ μs to the $20^{th}$ μs of the PPDU frame of the data packet.

1015. The receive end determines whether a rate value indicated by signaling information carried in the signaling symbol is 6 Mbps. If the receive end determines that the rate value indicated by the signaling information carried in the signaling symbol is 6 Mbps, 1020 is performed; if the receive end determines that the rate value indicated by the signaling information carried in the signaling symbol is not 6 Mbps, 1065 is performed.

Steps 1010 and 1015 are respectively similar to 810 and 820 in FIG. 8, and details are not described herein again.

1020. The receive end calculates a first metric value of a signaling symbol at the $20^{th}$ μs to the $24^{th}$ μs.

Step 1020 is similar to the process, described in 840 in FIG. 8, of calculating the first metric value of the signaling symbol at the $20^{th}$ μs to the $24^{th}$ μs, and details are not described herein again.

1025. The receive end determines whether the first metric value is greater than a third threshold, where the third threshold is greater than 0. If the receive end determines that the first metric value is greater than the third threshold, 1030 is performed; if the receive end determines that the first metric value is not greater than the third threshold, 1045 is performed. For example, according to the output result of Table 2, the third threshold may be $N_{SC}/2$.

1030. The receive end calculates a second metric value of a signaling symbol at the $24^{th}$ μs to the $28^{th}$ μs.

Step 1030 is similar to the process, described in 840 in FIG. 8, of calculating the second metric value of the signaling symbol at the $24^{th}$ μs to the $28^{th}$ μs, and details are not described herein again.

1035. The receive end determines whether the second metric value is greater than the third threshold.

If the receive end determines that the second metric value is greater than the third threshold, 1040 is performed; if the receive end determines that the second metric value is not greater than the positive third threshold, 1060 is performed and the format detection process is finished. For example, according to the output result of Table 2, the third threshold may be set to $N_{SC}/2$.

1040. When the second metric value is greater than the third threshold, the receive end determines that the format of the data packet is a legacy format, and ends the format detection process.

1045. The receive end determines whether the first metric value is less than a fourth threshold, where the fourth threshold is less than 0.

If the first metric value is less than the fourth threshold, 1055 is performed; if the first metric value is not less than the fourth threshold, 1050 is performed. For example, according to the output result of Table 2, the fourth threshold may be set to $-N_{SC}/2$.

1050. If it is determined that the first metric value is not less than the fourth threshold, the receive end determines that the format of the data packet is a HEW format, and ends the format detection process. It may be learned, according to Table 2, that the first metric value of the signaling symbol at the $20^{th}$ μs to the $24^{th}$ μs is less than $-N_{SC}/2$ only when the format of the data packet is an HT format.

1055. If it is determined that the first metric value is less than the fourth threshold, the receive end determines that the format of the data packet is a data packet of an HT format, and ends the format detection process.

1060. If it is determined that the second metric value is not greater than the third threshold, the receive end determines that the format of the data packet is a VHT format, and ends the format detection process.

1065. If it is determined that the rate value of the signaling information carried in the signaling symbol is not 6 Mbps, the receive end determines that the format of the data packet is a data packet of a legacy format, and ends the format detection process.

Figure 11:
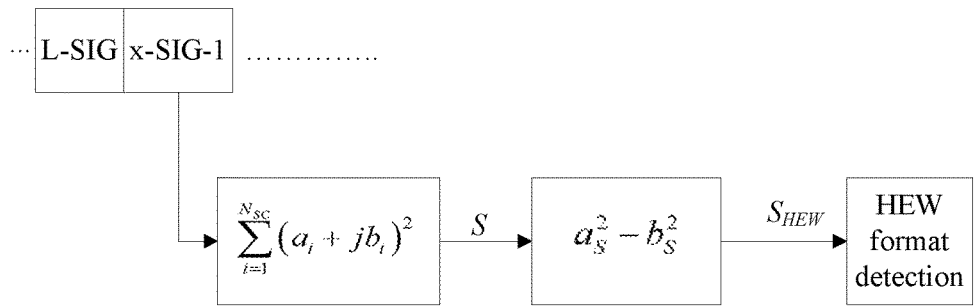
FIG. 11 is a schematic diagram of a process of detecting a data packet format according to another embodiment of the present invention.

FIG. 11 is a schematic diagram of a process of detecting a data packet format according to another embodiment of the present invention. The process of performing format detection on a data packet in this embodiment is similar to that in the embodiment in FIG. 6, and details are not described herein again. Different from the embodiment in FIG. 6, a new measurement method is proposed in this embodiment.

Specifically, first, signals (that is, signaling information) carried on subcarriers of an x-SIG1 signaling symbol are squared, and squares of the signals on the subcarriers are added up, to obtain the following operation result:

$$S = \sum_{i=1}^{N_{SC}} (a_i + jb_i)^2,$$

where $N_{sc}$ is a quantity of subcarriers carrying the signaling information, $a_i$ is a real part component of signaling information carried on a subcarrier i, and $b_i$ is an imaginary part component of the signaling information carried on the subcarrier i.

Then, energy of an imaginary part is subtracted from energy of a real part component of the operation result S to obtain the following operation result:

$$S_{HEW} = a_s^2 - b_s^2, \text{ where}$$

$a_s$ is the real part component of S, and $b_s$ is the imaginary part component of S.

For example, a detection algorithm is performed at the $20^{th}$ μs to the $24^{th}$ μs of the received data packet, and the metric value $S_{HEW}$ is calculated according to the formula $S_{HEW} = a_s^2 - b_s^2$.

If the format of the data packet is an HT format, an HT-SIG1 is sent at the $20^{th}$ μs to the $24^{th}$ μs. The HT-SIG1 is modulated by using a QBPSK manner, and in this case, the following operation result is obtained:

$$a_i = 0, i = 1, \ldots, N_{SC}$$

$$S = \sum_{i=1}^{N_{SC}} (a_i + jb_i)^2 = -\sum_{i=1}^{N_{SC}} b_i^2 = -N_{SC}$$

$$a_S = -N_{SC}; b_S = 0$$

$$S_{HEW} = a_S^2 - b_S^2 = N_{SC}^2$$

If the format of the data packet is a VHT format, a VHT-SIG-A1 is sent at the $20^{th}$ μs to the $24^{th}$ μs. The VHT-SIG-A1 is modulated by using a BPSK manner, and in this case, the following operation result is obtained:

$$b_i = 0, i = 1, \ldots, N_{SC} \quad (24)$$

$$S = \sum_{i=1}^{N_{SC}} (a_i + jb_i)^2 = \sum_{i=1}^{N_{SC}} a_i^2 = N_{SC}$$

$$a_S = N_{SC};$$

$$b_S = 0$$

$$S_{HEW} = a_S^2 - b_S^2 = N_{SC}^2$$

If the format of the data packet is a legacy format, a signal of a data field is sent at the $20^{th}$ μs to the $24^{th}$ μs. The signal of the data field may be modulated by using a BPSK, QPSK, or QAM manner.

If the signal of the data field is modulated by using the BPSK manner, $S_{HEW} = a_s^2 - b_s^2 = N_{SC}^2$ can be obtained.

If the signal of the data field is modulated by using the QPSK manner, the following operation result can be obtained:

$$P(a_i = 0.707, b_i = 0.707) = 0.25,$$

$$i = 1, 2, \ldots, N_{SC}$$

$$P(a_i = -0.707, b_i = 0.707) = 0.25,$$

$$i = 1, 2, \ldots, N_{SC}$$

$$P(a_i = -0.707, b_i = -0.707) = 0.25,$$

$$i = 1, 2, \ldots, N_{SC}$$

$$P(a_i = 0.707, b_i = -0.707) = 0.25,$$

$$i = 1, 2, \ldots, N_{SC}$$

$$a_i * b_i = \begin{cases} 1, & p = 0.5 \\ -1, & p = 0.5 \end{cases},$$

$$i = 1, 2, \ldots, N_{SC}$$

$$S = \sum_{i=1}^{N_{SC}} (a_i + jb_i)^2 = \sum_{i=1}^{N_{SC}} (a_i^2 - b_i^2 + 2ja_ib_i) = \sum_{i=1}^{N_{SC}} (2ja_ib_i) = 0$$

$$S_{HEW} = a_S^2 - b_S^2 = 0$$

Because the signal of the data field is distributed in a relatively random manner, the signal of the data field is evenly distributed among four points in a QPSK constellation diagram. If probabilities of all points are the same, a probability of each point is 0.25. Likewise, if the signal of the data field is modulated by using the QAM manner, a similar result may also be obtained. If the signal of the data field is distributed in a random manner, the obtained operation result is 0. In an actual process, in a QPSK or QAM constellation diagram, it is likely that the signal of the data field is mapped a little more frequently to a particular point. In this case, the obtained operation result may not be always 0 but should be a number close to 0. Therefore, a subsequent decision on a data packet format is not affected.

If the format of the data packet is a HEW format, a HEW-SIG-A1 is sent at this time position. A used modulation manner is BPSK of rotation by 45 degrees, and in this case, the following operation result is obtained:

$$P(a_i = 0.707, b_i = 0.707) + P(a_i = -0.707, b_i = -0.707) = 1,$$

$$i = 1, 2, \ldots, N_{SC}$$

$$P(a_i * b_i = 0.5) = 1,$$

$$i = 1, 2, \ldots, N_{SC}$$

-continued $$S = \sum_{i=1}^{N_{SC}} (a_i + jb_i)^2 = \sum_{i=1}^{N_{SC}} (a_i^2 - b_i^2 + 2ja_ib_i) = \sum_{i=1}^{N_{SC}} (2ja_ib_i) = jN_{SC}$$

$$a_S = 0;$$

$$b_S = N_{SC}$$

$$S_{HEW} = a_S^2 - b_S^2 = -N_{SC}^2$$

In conclusion, all possible outputs of a detector in FIG. 11 are shown in Table 3.

TABLE 3

| Output result of a HEW detector | | | | |
|---|---|---|---|---|
| | HT-SIG | VHT-SIG-A1 | L-Data | HEW-SIG |
| Modulation manner | QBPSK | BPSK | BPSK | QPSK | BPSK of rotation by 45 degrees |
| S | $-N_{SC}$ | $N_{SC}$ | $N_{SC}$ | 0 | $jN_{SC}$ |
| $S_{HEW}$ | $N_{SC}^2$ | $N_{SC}^2$ | $N_{SC}^2$ | 0 | $-N_{SC}^2$ |

Then, an output result (that is, the calculated metric value) of the detector can be compared with a preset threshold. For example, a threshold may be set for $S_{HEW}$, and the calculated metric value is compared with the preset threshold according to a possible output result of a HEW detector.

Finally, a format of a received data packet is determined according to a result of comparison between the metric value and the preset threshold. For example, when the metric value $S_{HEW}$ is less than the preset threshold $-N_{SC}^2/2$, it can be determined that the received data packet is a data packet of the HEW format.

Figure 12:
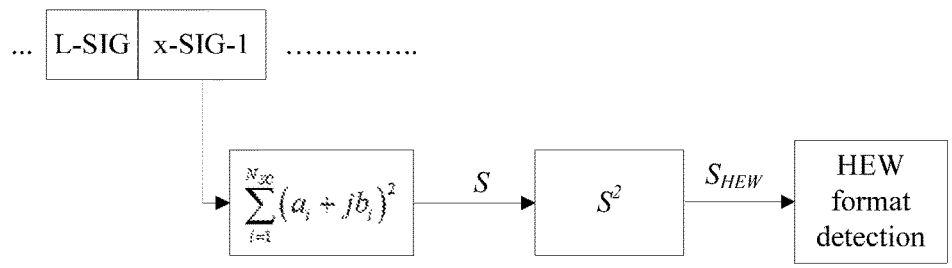
FIG. 12 is a schematic diagram of performing format detection on a data packet according to another embodiment of the present invention.

FIG. 12 is a schematic diagram of performing format detection on a data packet according to another embodiment of the present invention. A process of performing format detection on a data packet in this embodiment is similar to that in the embodiment in FIG. 6, and details are not described herein again.

Different from the embodiment in FIG. 6, a new measurement method is proposed in this embodiment. For example, first, squares of signals of subcarriers are added up to obtain the following operation result:

$$S = \sum_{i=1}^{N_{SC}} (a_i + jb_i)^2,$$

where $N_{SC}$ is a quantity of subcarriers carrying signaling information, $a_i$ is a real part component of signaling information carried on a subcarrier i, and $b_i$ is an imaginary part component of the signaling information carried on the subcarrier i.

Then, the operation result S is squared to obtain the following operation result:

$$S_{HEW} = S^2$$

For example, the uplink detection algorithm is performed at the $20^{th}$ μs to the $24^{th}$ μs of the data packet, and the metric value $S_{HEW}$ is calculated according to the formula $S_{HEW}=S^2$.

If a format of the data packet is an HT format, an HT-SIG1 is sent at the $20^{th}$ μs to the $24^{th}$ μs. The HT-SIG1 is modulated by using a QBPSK manner, and the following operation result is obtained:

$$a_i = 0, i = 1, \ldots, N_{SC}$$

$$S = \sum_{i=1}^{N_{SC}} (a_i + jb_i)^2 = -\sum_{i=1}^{N_{SC}} b_i^2 = -N_{SC}$$

$$S_{HEW} = S^2 = N_{SC}^2$$

If the format of the data packet is a VHT format, a VHT-SIG-A1 is sent at the $20^{th}$ μs to the $24^{th}$ μs. The VHT-SIG-A1 is modulated by using a BPSK manner, and in this case, the following operation result is obtained:

$$b_i = 0, i = 1, \ldots, N_{SC}$$

$$S = \sum_{i=1}^{N_{SC}} (a_i + jb_i)^2 = \sum_{i=1}^{N_{SC}} a_i^2 = N_{SC}$$

$$S_{HEW} = S^2 = N_{SC}^2$$

If the format of the data packet is a legacy format, a signal of a data field is sent at the $20^{th}$ μs to the $24^{th}$ μs. The signal of the data field may be modulated by using a BPSK, QPSK, or QAM manner.

If the signal of the data field is modulated by using the BPSK manner, $S_{HEW}=S^2=N_{SC}^2$ can be obtained.

If the signal of the data field is modulated by using the QPSK manner, the following operation result is obtained:

$$P(a_i = 0.707, b_i = 0.707) = 0.25,$$

$$i = 1, 2, \ldots, N_{SC}$$

$$P(a_i = -0.707, b_i = 0.707) = 0.25,$$

$$i = 1, 2, \ldots, N_{SC}$$

$$P(a_i = -0.707, b_i = -0.707) = 0.25,$$

$$i = 1, 2, \ldots, N_{SC}$$

$$P(a_i = 0.707, b_i = -0.707) = 0.25,$$

$$i = 1, 2, \ldots, N_{SC}$$

$$a_i * b_i = \begin{cases} 1, & p = 0.5 \\ -1, & p = 0.5 \end{cases},$$

$$i = 1, 2, \ldots, N_{SC}$$

$$S = \sum_{i=1}^{N_{SC}} (a_i + jb_i)^2 = \sum_{i=1}^{N_{SC}} (a_i^2 - b_i^2 + 2ja_ib_i) = \sum_{i=1}^{N_{SC}} (2ja_ib_i) = 0$$

$$S_{HEW} = S^2 = 0$$

Because the signal of the data field is distributed in a random manner, the signal of the data field is evenly distributed among four points in a QPSK constellation diagram. If probabilities of all points are the same, a probability of each point is 0.25. Likewise, if the signal of the data field is modulated by using the QAM manner, a similar result may also be obtained. If the signal of the data field is distributed in a completely random manner, the obtained operation result is 0. In an actual process, in a QPSK or QAM constellation diagram, it is likely that the signal of the data field is mapped a little more frequently to a particular point. In this case, the obtained operation result may not be always 0 but should be a number close to 0. Therefore, a subsequent decision on a data packet format is not affected.

If the format of the data packet is a HEW format, a HEW-SIG-A1 is sent at this time position. A used modulation manner is BPSK of rotation by 45 degrees, and in this case, the following operation result is obtained:

$$P(a_i = 0.707, b_i = 0.707) + P(a_i = -0.707, b_i = -0.707) = 1, \quad (34)$$
$$i = 1, 2, \ldots, N_{SC}$$
$$P(a_i * b_i = 0.5) = 1,$$
$$i = 1, 2, \ldots, N_{SC}$$
$$S = \sum_{i=1}^{N_{SC}} (a_i + jb_i)^2 = \sum_{i=1}^{N_{SC}} (a_i^2 - b_i^2 + 2ja_ib_i) = \sum_{i=1}^{N_{SC}} (2ja_ib_i) = jN_{SC}$$
$$S_{HEW} = S^2 = -N_{SC}^2$$

In conclusion, all possible outputs of a detector in FIG. 12 are shown in Table 4.

TABLE 4

| | \multicolumn{5}{c|}{Output result of a HEW detector} |
|---|---|---|---|---|---|
| | HT-SIG | VHT-SIG-A1 | Legacy format data | HEW-SIG | |
| Modulation manner | QBPSK | BPSK | BPSK | QPSK | BPSK of rotation by 45 degrees |
| S | $-N_{SC}$ | $N_{SC}$ | $N_{SC}$ | 0 | $jN_{SC}$ |
| $S_{HEW}$ | $N_{SC}^2$ | $N_{SC}^2$ | $N_{SC}^2$ | 0 | $-N_{SC}^2$ |

In this embodiment, the receive end can compare an output result (that is, the calculated metric value) of the detector with a preset threshold, and determine a format of a received data packet according to a result of comparison between the metric value and the preset threshold. A process thereof is similar to that of the embodiment in FIG. 11, and details are not described herein again.

Figure 13:
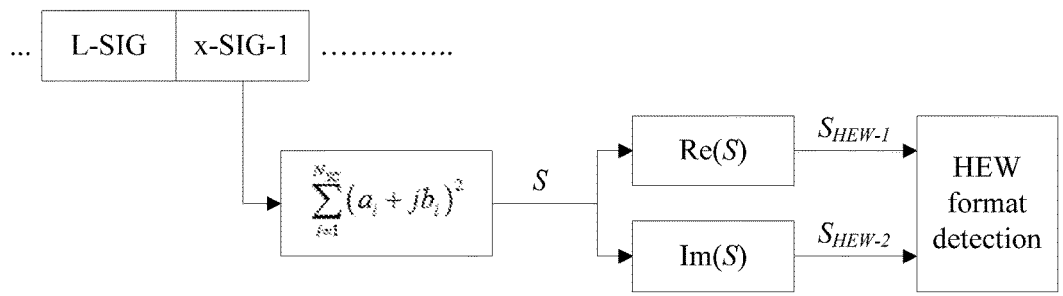
FIG. 13 is a schematic diagram of performing format detection on a data packet according to another embodiment of the present invention.

FIG. 13 is a schematic diagram of performing format detection on a data packet according to another embodiment of the present invention. A process of performing format detection on a data packet in this embodiment is similar to that in the embodiment in FIG. 6, and details are not described herein again. Different from the embodiment in FIG. 6, a new measurement method is proposed in this embodiment.

Specifically, first, signals (that is, signaling information) carried on subcarriers of an x-SIG1 signaling symbol are squared, and squares of the signals on the subcarriers are added up, to obtain the following operation result:

$$S = \sum_{i=1}^{N_{SC}} (a_i + jb_i)^2,$$

where
$N_{SC}$ is a quantity of subcarriers carrying signaling information, $a_i$ is a real part component of signaling information carried on a subcarrier i, and $b_i$ is an imaginary part component of the signaling information carried on the subcarrier i.

Then, a real part component and an imaginary part component of the operation result S are respectively used as metric values, that is $S_{HEW-1}=\text{Re}(S)$ and $S_{HEW-2}=\text{Im}(S)$, where Re(S) is the real part component of S, and Im(S) is the imaginary part component of S.

For example, the detection algorithm is performed at the $20^{th}$ μs to the $24^{th}$ μs of a received data packet, and the metric values $S_{HEW-1}$ and $S_{HEW-2}$ are calculated according to the formulas.

If the data packet is a data packet of an HT format, an HT-SIG1 is sent at the $20^{th}$ μs to the $24^{th}$ μs. Signaling information carried on the HT-SIG1 is modulated by using a QBPSK manner, and there is the following operation result:

$$a_i = 0,$$
$$i = 1, \ldots, N_{SC}$$
$$S = \sum_{i=1}^{N_{SC}} (a_i + jb_i)^2 = -\sum_{i=1}^{N_{SC}} b_i^2 = -N_{SC}$$
$$S_{HEW-1} = -N_{SC}$$
$$S_{HEW-2} = 0$$

If the data packet is a data packet of a VHT format, a VHT-SIG-A1 is sent at the $20^{th}$ μs to the $24^{th}$ μs. Signaling information carried on the VHT-SIG-A1 is modulated by using a BPSK manner, and there is the following operation result:

$$b_i = 0,$$
$$i = 1, \ldots, N_{SC}$$
$$S = \sum_{i=1}^{N_{SC}} (a_i + jb_i)^2 = \sum_{i=1}^{N_{SC}} a_i^2 = N_{SC}$$
$$S_{HEW-1} = N_{SC}$$
$$S_{HEW-2} = 0$$

If the data packet is a data packet of a legacy format, a signal of a data field is sent at the $20^{th}$ μs to the $24^{th}$ μs. The signal of the data field may be modulated by using a BPSK, QPSK, or QAM manner.

If the signal of the data field is modulated by using the BPSK manner, $S_{HEW-1}=N_{SC}$ and $S_{HEW-2}=0$ can be obtained.

If the signal of the data field is modulated by using the QPSK manner, the following operation result is obtained:

$$P(a_i = 0.707, b_i = 0.707) = 0.25,$$
$$i = 1, 2, \ldots, N_{SC}$$
$$P(a_i = -0.707, b_i = 0.707) = 0.25,$$
$$i = 1, 2, \ldots, N_{SC}$$
$$P(a_i = -0.707, b_i = -0.707) = 0.25,$$
$$i = 1, 2, \ldots, N_{SC}$$
$$P(a_i = 0.707, b_i = -0.707) = 0.25,$$
$$i = 1, 2, \ldots, N_{SC}$$

-continued $$a_i * b_i = \begin{cases} 1, & p = 0.5 \\ -1, & p = 0.5 \end{cases},$$

$$i = 1, 2, \ldots, N_{SC}$$

$$S = \sum_{i=1}^{N_{SC}} (a_i + jb_i)^2 = \sum_{i=1}^{N_{SC}} (a_i^2 - b_i^2 + 2ja_ib_i) = \sum_{i=1}^{N_{SC}} (2ja_ib_i) = 0$$

$$S_{HEW-1} = 0$$

$$S_{HEW-2} = 0$$

Because the signal of the data field is distributed in a random manner, the signal of the data field is evenly distributed among four points in a QPSK constellation diagram. If probabilities of all points are the same, a probability of each point is 0.25. Likewise, if the signal of the data field is modulated by using the QAM manner, a similar result may also be obtained. If the signal of the data field is distributed in a completely random manner, the obtained operation result is 0. In an actual process, in a QPSK or QAM constellation diagram, it is likely that the signal of the data field is mapped a little more frequently to a particular point. In this case, the obtained operation result may not be always 0 but should be a number close to 0. Therefore, a subsequent decision on a data packet format is not affected.

If the format of the data packet is a HEW format, a HEW-SIG-A1 is sent at this time position. A used modulation manner is BPSK of rotation by 45 degrees, and in this case, the following operation result is obtained:

$$P(a_i = 0.707, b_i = 0.707) + P(a_i = -0.707, b_i = -0.707) = 1,$$

$$i = 1, 2, \ldots, N_{SC}$$

$$P(a_i * b_i = 0.5) = 1,$$

$$i = 1, 2, \ldots, N_{SC}$$

$$S = \sum_{i=1}^{N_{SC}} (a_i + jb_i)^2 = \sum_{i=1}^{N_{SC}} (a_i^2 - b_i^2 + 2ja_ib_i) = \sum_{i=1}^{N_{SC}} (2ja_ib_i) = jN_{SC}$$

$$S_{HEW-1} = 0$$

$$S_{HEW-2} = N_{SC}$$

In conclusion, all possible outputs of a detector in FIG. 13 are shown in Table 5.

TABLE 5

Output results of a HEW detector

|  | HT-SIG | VHT-SIG-A1 | Legacy format data | HEW-SIG |  |
| --- | --- | --- | --- | --- | --- |
| Modulation manner | QBPSK | BPSK | BPSK | QPSK | BPSK of rotation by 45 degrees |
| $S_{HEW-1}$ | $-N_{SC}$ | $N_{SC}$ | $N_{SC}$ | 0 | 0 |
| $S_{HEW-2}$ | 0 | 0 | 0 | 0 | $N_{SC}$ |

Then, output results (that is, the calculated metric values) of the detector can be compared with preset thresholds. For example, preset thresholds may be set for $S_{HEW-1}$ and $S_{HEW-2}$ according to possible output results of a HEW detector, and the calculated metric values are compared with the preset thresholds.

Finally, a format of the received data packet is determined according to results of comparison between the metric values and the preset thresholds. For example, when the metric value $S_{HEW-2}$ is greater than a preset threshold (for example, $N_{SC}/2$), it can be determined that the received data packet is a data packet of the HEW format.

It should be noted that if only the data packet of the HEW format needs to be identified, only $S_{HEW-2}$ may be used as the metric value. Because this metric value is a positive number greater than 0 for only the data packet of the HEW format, this metric value is 0 for a data packet of another format.

Figure 14:
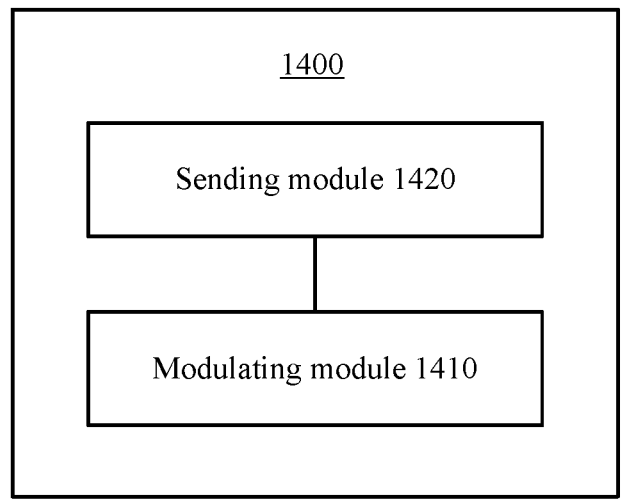
FIG. 14 is a schematic structural diagram of an apparatus for transmitting signaling according to an embodiment of the present invention.

FIG. 14 is a schematic structural diagram of an apparatus 1400 for transmitting signaling according to an embodiment of the present invention. The apparatus 1400 includes a modulating module 1410 and a sending module 1420.

The modulating module 1410 modulates, by using a binary phase shift keying BPSK manner of rotation by a first angle, at least partial signaling information carried in at least one signaling symbol in a signaling field of a data packet, to obtain modulated signaling information, where the first angle is not equal to 0 degrees or 90 degrees. The sending module 1420 sends, to a receive end, the data packet that carries the modulated signaling information, where the BPSK manner of rotation by the first angle is corresponding to a format of the data packet.

According to an embodiment of the present invention, a transmit end may modulate signaling information carried in a signaling symbol in the signaling field of the data packet by using the binary phase shift keying BPSK manner of rotation by the preset angle. In this embodiment of the present invention, the signaling field of the data packet is modulated by using a modulation manner different from a conventional modulation manner, so that a data packet format corresponding to such a modulation manner can be distinguished from a conventional data packet format.

According to an embodiment of the present invention, the first angle is N*45 degrees, and N is an integer not equal to 0 or 2.

According to an embodiment of the present invention, the modulating module 1410 modulates all signaling information carried in one signaling symbol in the signaling field of the data packet by using a BPSK manner of rotation by 45 degrees.

According to an embodiment of the present invention, the modulating module 1410 modulates all signaling information carried in two signaling symbols in the signaling field of the data packet by using a BPSK manner of rotation by 45 degrees.

According to an embodiment of the present invention, the modulating module 1410 modulates, by using a BPSK manner of rotation by 45 degrees, all signaling information carried in all signaling symbols in the signaling field of the data packet.

According to an embodiment of the present invention, the modulating module 1410 is further configured to modulate, by using a BPSK manner of rotation by a second angle, signaling information carried in another signaling symbol, except the at least one signaling symbol, in the signaling field of the data packet, where the second angle is M*45 degrees, and M is an integer.

According to an embodiment of the present invention, the at least one signaling symbol is at least one orthogonal frequency division multiplexing OFDM symbol, and subcarriers corresponding to each OFDM symbol in the at least one OFDM symbol include an even-numbered subcarrier and an odd-numbered subcarrier; and the modulating module is configured to modulate, by using the BPSK manner of rotation by the first angle, first partial signaling information carried on either of the even-numbered subcarrier and the odd-numbered subcarrier.

Optionally, in another embodiment, the modulating module further modulates, by using a BPSK manner of rotation by a second angle, second partial signaling information carried on the other one of the even-numbered subcarrier and the odd-numbered subcarrier, where the second angle is M*45 degrees, and M is an integer.

According to an embodiment of the present invention, the first angle is 45 degrees, and the second angle is 0 degrees.

According to an embodiment of the present invention, the format of the data packet is the high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

According to an embodiment of the present invention, the signaling field is a signaling field in an advanced wireless system AWS, and the at least one signaling symbol is at least one of an AWS-SIG1 and an AWS-SIG2.

Figure 15:
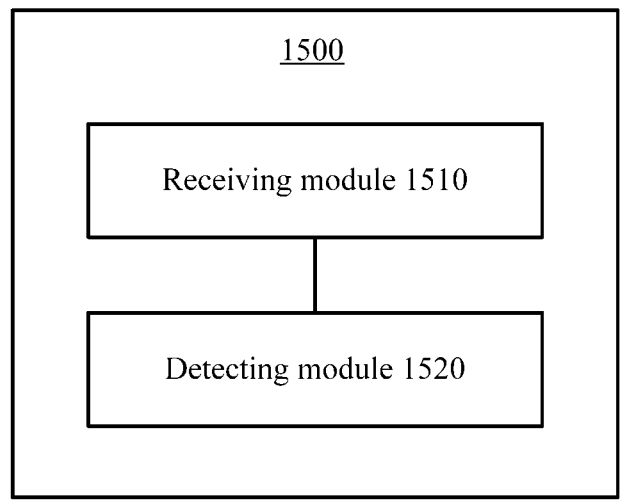
FIG. 15 is a schematic structural diagram of an apparatus for transmitting signaling according to another embodiment of the present invention.

FIG. 15 is a schematic structural diagram of an apparatus 1500 for transmitting signaling according to another embodiment of the present invention. The apparatus 1500 includes a receiving module 1510 and a detecting module 1520.

The receiving module 1510 is configured to receive a data packet sent by a transmit end, where a signaling field of the data packet carries modulated signaling information. The detecting module 1520 detects the modulated signaling information to determine a format of the data packet, where if the transmit end modulates, by using a binary phase shift keying BPSK manner of rotation by a first angle, at least partial signaling information carried in at least one signaling symbol in the signaling field of the data packet, it is determined, by detecting the modulated signaling information, that the format of the data packet is a data packet format corresponding to the BPSK manner of rotation by the first angle, where the first angle is not equal to 0 degrees or 90 degrees.

According to an embodiment of the present invention, a receive end may detect signaling information modulated by using a BPSK manner of rotation by a preset angle, to determine the format of the data packet. In this embodiment of the present invention, the signaling field of the data packet is modulated at the transmit end by using a modulation manner different from a conventional modulation manner, so that the receive end can distinguish a data packet format corresponding to such a modulation manner from a conventional data packet format.

According to an embodiment of the present invention, the first angle is N*45 degrees, and N is an integer not equal to 0 or 2; the detecting module 1520 detects a real part component and an imaginary part component of the signaling information, and compares a result of the detecting with a preset threshold, to determine the format of the data packet.

According to an embodiment of the present invention, the at least one signaling symbol is at least one OFDM symbol; and the detecting module 1520 is configured to: multiply a real part component and an imaginary part component of modulated signaling information carried on each subcarrier corresponding to the at least one OFDM symbol to obtain at least one product, and add up the at least one product to obtain a sum of the at least one product:

$$S_{HEW} = \sum_{i=1}^{N_{SC}} (a_i * b_i),$$

where
$N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compare $S_{HEW}$ with a first threshold, where the first threshold is greater than or equal to 0; and if $S_{HEW}$ is greater than the first threshold, determine that the format of the data packet is the data packet format corresponding to the binary phase shift keying manner of rotation by the first angle.

According to an embodiment of the present invention, the at least one signaling symbol is at least one OFDM symbol; and the detecting module 1520 is configured to: add up a square of modulated signaling information carried on each subcarrier corresponding to the at least one OFDM symbol to obtain at least one quadratic sum:

$$S = (a_s + jb_s) = \sum_{i=1}^{N_{SC}} (a_i + jb_i)^2,$$

where
$N_{SC}$ is a quantity of subcarriers carrying the modulated signaling information, $N_{SC} \geq 1$, $a_i$ is a real part component that is of the signaling information and that is carried on a subcarrier i, $b_i$ is an imaginary part component that is of the signaling information and that is carried on the subcarrier i, $a_s$ is a real part component of S, and $b_s$ is an imaginary part component of S; and determine, according to the real part component and the imaginary part component of S, that the format of the data packet is the data packet format corresponding to the binary phase shift keying manner of rotation by the first angle.

According to an embodiment of the present invention, the detecting module 1520 subtracts a square of the imaginary part component of S from a square of the real part component of S to obtain: $S_{HEW} = a_s^2 - b_s^2$; and compares $S_{HEW}$ with a second threshold, where the second threshold is less than or equal to 0; and if $S_{HEW}$ is less than the second threshold, determines that the format of the data packet is the data packet format corresponding to the binary phase shift keying manner of rotation by the first angle.

According to an embodiment of the present invention, the detecting module 1520 squares S to obtain: $S_{HEW} = (S)^2$; compares $S_{HEW}$ with a second threshold, where the second threshold is less than or equal to 0; and if $S_{HEW}$ is less than the second threshold, determines that the format of the data packet is the data packet format corresponding to the binary phase shift keying manner of rotation by the first angle.

According to an embodiment of the present invention, the detecting module 1520 is configured to compare the real part component of S with the imaginary part component of S; and determine, according to a result of comparison between the real part component and the imaginary part component, whether the format of the data packet is the data packet format corresponding to the binary phase shift keying manner of rotation by the first angle.

According to an embodiment of the present invention, the at least one signaling symbol is at least one OFDM symbol; and the detecting module 1520 subtracts a square of an imaginary part component of modulated signaling information carried on each subcarrier corresponding to the at least one OFDM symbol from a square of a real part component of the modulated signaling information carried on each subcarrier co to obtain at least one difference, and adds up the at least one difference to obtain a sum of the at least one difference:

$$S = \sum_{i=1}^{N_{SC}} (a_i^2 - b_i^2),$$

where $N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compares S with a first range, where the first range is a subinterval of an open interval $(-N_{SC}, N_{SC})$; and if S is in the first range, determines that the format of the data packet is the data packet format corresponding to the binary phase shift keying manner of rotation by the first angle.

Optionally, in another embodiment, if the transmit end modulates at least partial signaling information carried in at least one signaling symbol in the signaling field of the data packet by using a second modulation manner, the detecting module 1520 further compares S with a second range, where the second range is a subinterval of the open interval $(-N_{SC}, N_{SC})$ and if S is in the second range, determines that the format of the data packet is a data packet format corresponding to the second modulation manner, where the second range is different from the first range, the second modulation manner is BPSK corresponding to a legacy format, QBPSK corresponding to an HT format, or BPSK and QBPSK corresponding to a VHT format.

Optionally, in another embodiment, the at least one OFDM symbol includes a first OFDM symbol and a second OFDM symbol, S obtained for the first OFDM symbol is $S_1$, and S obtained for the second OFDM symbol is $S_2$; and when $$\begin{cases} S_1 < -N_{SC}/2 \\ S_2 < -N_{SC}/2 \end{cases},$$

the detecting module 1520 determines that the format of the received data packet is the HT format; or when $$\begin{cases} S_1 > N_{SC}/2 \\ S_2 < -N_{SC}/2 \end{cases},$$

the detecting module 1520 determines that the format of the data packet is the VHT format; or when $$\begin{cases} -N_{SC}/2 < S_1 < N_{SC}/2 \\ -N_{SC}/2 < S_2 < N_{SC}/2 \end{cases},$$

the detecting module 1520 determines that the format of the data packet is a HEW format.

According to an embodiment of the present invention, the at least one signaling symbol includes a first signaling symbol and a second signaling symbol; and the detecting module 1520 detects a real part component and an imaginary part component of signaling information carried in the first signaling symbol to obtain a first detection result; compares the first detection result with a third threshold, where the third threshold is greater than 0; if the first detection result is greater than the third threshold, detects a real part component and an imaginary part component of signaling information carried in the second signaling symbol to obtain a second detection result or a second metric value; compares the second detection result with the third threshold; if the second detection result is greater than the third threshold, determines that the format of the data packet is a legacy format, or if the second detection result is not greater than the third threshold, determines that the format of the data packet is the VHT format; if the first detection result is not greater than the third threshold, compares the first detection result with a fourth threshold; and if the first detection result is less than the fourth threshold, determines that the format of the data packet is the HT format, or if the first detection result is not less than the fourth threshold, determines that the format of the data packet is the HEW format, where the fourth threshold is less than 0.

According to an embodiment of the present invention, the first detection result and the second detection result are obtained from the following formula:
where $$S = \sum_{i=1}^{N_{SC}} (a_i^2 - b_i^2),$$

$N_{SC}$ is the quantity of subcarriers carrying the modulated signaling information, $N_{SC} \geq 1$, $a_i$ is the real part component that is of the modulated signaling information and that is carried on the subcarrier i, and $b_i$ is the imaginary part component that is of the modulated signaling information and that is carried on the subcarrier i.

For example, the at least one signaling symbol includes a first OFDM symbol and a second OFDM symbol, S obtained for the first OFDM symbol is $S_1$, and S obtained for the second OFDM symbol is $S_2$; if $S_1$ is greater than a third threshold and $S_2$ is greater than the third threshold, it is determined that the format of the data packet is a legacy format; or if $S_1$ is greater than a third threshold and $S_2$ is less than a fourth threshold, it is determined that the format of the data packet is the VHT format; or if $S_1$ is less a fourth threshold and $S_2$ is less than the fourth threshold, it is determined that the format of the data packet is the HT format; or if $S_1$ is less a third threshold and $S_1$ is greater than a fourth threshold, and, $S_2$ is less the third threshold and $S_2$ is greater than the fourth threshold, it is determined that the format of the data packet is a HEW format; where the third threshold is greater than 0, and the fourth threshold is less than 0.

According to an embodiment of the present invention, the at least one signaling symbol is at least one OFDM symbol, subcarriers in the OFDM symbol include an even-numbered subcarrier and an odd-numbered subcarrier, a signaling symbol carried on either of the odd-numbered subcarrier and the even-numbered subcarrier is modulated by using the binary phase shift keying manner of rotation by the first angle, and a signaling symbol carried on the other one of the odd-numbered subcarrier and the even-numbered subcarrier is modulated by using a binary phase shift keying manner of rotation by a second angle, where the second angle is M*45 degrees, and M is an integer.

According to an embodiment of the present invention, the format of the data packet is the high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

According to an embodiment of the present invention, the signaling field is a signaling field in an advanced wireless system AWS, and the at least one signaling symbol is at least one of an AWS-SIG1 and an AWS-SIG2.

Figure 16:
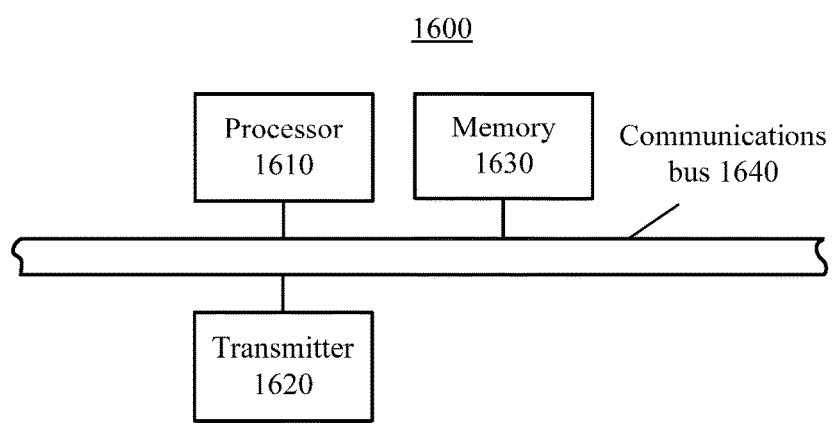
FIG. 16 is a schematic structural diagram of an apparatus for transmitting signaling according to another embodiment of the present invention.

FIG. 16 is a schematic structural diagram of an apparatus 1600 for transmitting signaling according to another embodiment of the present invention. The apparatus 1600 includes a processor 1610, a transmitter 1620, a memory 1630, and a communications bus 1640.

The processor 1610 is configured to invoke, by using the communications bus 1640, code stored in the memory 1630, so as to modulate, by using a binary phase shift keying BPSK manner of rotation by a first angle, at least partial signaling information carried in at least one signaling symbol in a signaling field of a data packet, to obtain modulated signaling information, where the first angle is not equal to 0 degrees or 90 degrees. The transmitter 1620 sends, to a receive end, the data packet that carries the modulated signaling information, where the BPSK manner of rotation by the first angle is corresponding to a format of the data packet.

According to an embodiment of the present invention, a transmit end may modulate signaling information carried in a signaling symbol in the signaling field of the data packet by using the binary phase shift keying BPSK manner of rotation by the preset angle. In this embodiment of the present invention, the signaling field of the data packet is modulated by using a modulation manner different from a conventional modulation manner, so that a data packet format corresponding to such a modulation manner can be distinguished from a conventional data packet format.

According to an embodiment of the present invention, the first angle is N*45 degrees, and N is an integer not equal to 0 or 2.

According to an embodiment of the present invention, the processor 1610 modulates all signaling information carried in one signaling symbol in the signaling field of the data packet by using a BPSK manner of rotation by 45 degrees.

According to an embodiment of the present invention, the processor 1610 modulates all signaling information carried in two signaling symbols in the signaling field of the data packet by using a BPSK manner of rotation by 45 degrees.

According to an embodiment of the present invention, the processor 1610 modulates, by using a BPSK manner of rotation by 45 degrees, all signaling information carried in all signaling symbols in the signaling field of the data packet.

According to an embodiment of the present invention, the processor 1610 is further configured to modulate, by using a BPSK manner of rotation by a second angle, signaling information carried in another signaling symbol, except the at least one signaling symbol, in the signaling field of the data packet, where the second angle is M*45 degrees, and M is an integer.

According to an embodiment of the present invention, the at least one signaling symbol is at least one orthogonal frequency division multiplexing OFDM symbol, and subcarriers corresponding to each OFDM symbol in the at least one OFDM symbol include an even-numbered subcarrier and an odd-numbered subcarrier; and the processor 1610 modulates, by using the BPSK manner of rotation by the first angle, first partial signaling information carried on either of the even-numbered subcarrier and the odd-numbered subcarrier.

Optionally, in another embodiment, the processor 1610 further modulates, by using a BPSK manner of rotation by a second angle, second partial signaling information carried on the other one of the even-numbered subcarrier and the odd-numbered subcarrier, where the second angle is M*45 degrees, and M is an integer.

According to an embodiment of the present invention, the first angle is 45 degrees, and the second angle is 0 degrees.

According to an embodiment of the present invention, a format of the data packet is a high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

According to an embodiment of the present invention, the signaling field is a signaling field in an advanced wireless system AWS, and the at least one signaling symbol is at least one of an AWS-SIG1 and an AWS-SIG2.

Figure 17:
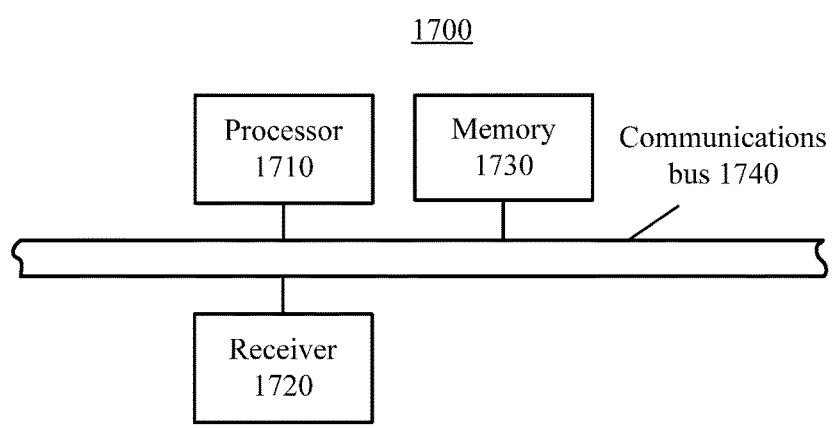
FIG. 17 is a schematic structural diagram of an apparatus for transmitting signaling according to an embodiment of the present invention.

FIG. 17 is a schematic structural diagram of an apparatus 1700 for transmitting signaling according to an embodiment of the present invention. The apparatus 1700 includes a processor 1710, a receiver 1720, a memory 1730, and a communications bus 1740.

The receiver 1720 is configured to receive a data packet sent by a transmit end, where a signaling field of the data packet carries modulated signaling information. The processor 1710 is configured to invoke, by using the communications bus 1740, code stored in the memory 1730, so as to detect the modulated signaling information to determine a format of the data packet, where if the transmit end modulates, by using a binary phase shift keying BPSK manner of rotation by a first angle, at least partial signaling information carried in at least one signaling symbol in the signaling field of the data packet, it is determined, by detecting the modulated signaling information, that the format of the data packet is a data packet format corresponding to the BPSK manner of rotation by the first angle, where the first angle is not equal to 0 degrees or 90 degrees.

According to an embodiment of the present invention, a receive end may detect signaling information modulated by using a BPSK manner of rotation by a preset angle, to determine the format of the data packet. In this embodiment of the present invention, the signaling field of the data packet is modulated at the transmit end by using a modulation manner different from a conventional modulation manner, so that the receive end can distinguish a data packet format corresponding to such a modulation manner from a conventional data packet format.

According to an embodiment of the present invention, the first angle is N*45 degrees, and N is an integer not equal to 0 or 2; the processor 1710 detects a real part component and an imaginary part component of the signaling information, and compares a result of the detecting with a preset threshold, to determine the format of the data packet.

According to an embodiment of the present invention, the at least one signaling symbol is at least one OFDM symbol; and the processor 1710 is configured to: multiply a real part component and an imaginary part component of modulated signaling information carried on each subcarrier corresponding to the at least one OFDM symbol to obtain at least one product, and add up the at least one product to obtain a sum of the at least one product:

$$S_{HEW} = \sum_{i=1}^{N_{SC}} (a_i * b_i),$$

where
$N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compare $S_{HEW}$ with a first threshold, where the first threshold is greater than or equal to 0; and if $S_{HEW}$ is greater than the first threshold, determine that the format of the data packet is the data packet format corresponding to the binary phase shift keying manner of rotation by the first angle.

According to an embodiment of the present invention, the at least one signaling symbol is at least one OFDM symbol; and the processor 1710 is configured to: add up a square of modulated signaling information carried on each subcarrier corresponding to the at least one OFDM symbol to obtain at least one quadratic sum:

$$S = (a_s + jb_s) = \sum_{i=1}^{N_{SC}} (a_i + jb_i)^2,$$

where
$N_{SC}$ is a quantity of subcarriers carrying the modulated signaling information, $N_{SC} \geq 1$, $a_i$ is a real part component that is of the signaling information and that is carried on a subcarrier i, $b_i$ is an imaginary part component that is of the signaling information and that is carried on the subcarrier i, $a_s$ is a real part component of S, and $b_s$ is an imaginary part component of S; and determine, according to the real part component and the imaginary part component of S, that the format of the data packet is the data packet format corresponding to the binary phase shift keying manner of rotation by the first angle.

According to an embodiment of the present invention, the processor 1710 subtracts a square of the imaginary part component of S from a square of the real part component of S to obtain: $s_{HEW} = a_s^2 - b_s^2$; and compares $S_{HEW}$ with a second threshold, where the second threshold is less than or equal to 0; and if $S_{HEW}$ is less than the second threshold, determines that the format of the data packet is the data packet format corresponding to the binary phase shift keying manner of rotation by the first angle.

According to an embodiment of the present invention, the processor 1710 squares S to obtain: $S_{HEW} = (S)^2$; compares $S_{HEW}$ with a second threshold, where the second threshold is less than or equal to 0; and if $S_{HEW}$ is less than the second threshold, determines that the format of the data packet is the data packet format corresponding to the binary phase shift keying manner of rotation by the first angle.

According to an embodiment of the present invention, the processor 1710 is configured to compare the real part component of S with the imaginary part component of S; and determine, according to a result of comparison between the real part component and the imaginary part component, whether the format of the data packet is the data packet format corresponding to the binary phase shift keying manner of rotation by the first angle.

According to an embodiment of the present invention, the at least one signaling symbol is at least one OFDM symbol; and the processor 1710 subtracts a square of an imaginary part component of modulated signaling information carried on each subcarrier corresponding to the at least one OFDM symbol from a square of a real part component of the modulated signaling information carried on each subcarrier co to obtain at least one difference, and adds up the at least one difference to obtain a sum of the at least one difference:

$$S = \sum_{i=1}^{N_{SC}} (a_i^2 - b_i^2),$$

where
$N_{SC}$ is a quantity of subcarriers carrying the modulated signaling information, $N_{SC} \geq 1$, $a_i$ is a real part component that is of the modulated signaling information and that is carried on a subcarrier i, and $b_i$ is an imaginary part component that is of the modulated signaling information and that is carried on the subcarrier i; compares S with a first range, where the first range is a subinterval of an open interval $(S, -N_{SC})$, and if $N_{SC}$ is in the first range, determines that the format of the data packet is the data packet format corresponding to the binary phase shift keying manner of rotation by the first angle.

Optionally, in another embodiment, if the transmit end modulates at least partial signaling information carried in at least one signaling symbol in the signaling field of the data packet by using a second modulation manner, the processor 1710 further compares S with a second range, where the second range is a subinterval of the open interval $(S, -N_{SC})$; and if S is in the second range, determines that the format of the data packet is a data packet format corresponding to the second modulation manner, where the second range is different from the first range, the second modulation manner is BPSK corresponding to a legacy format, QBPSK corresponding to an HT format, or BPSK and QBPSK corresponding to a VHT format.

Optionally, in another embodiment, the at least one OFDM symbol includes a first OFDM symbol and a second OFDM symbol, S obtained for the first OFDM symbol is $S_1$, and S obtained for the second OFDM symbol is $S_2$; and when $$\begin{cases} S_1 < -N_{SC}/2 \\ S_2 < -N_{SC}/2 \end{cases},$$

the processor 1710 determines that the format of the received data packet is the HT format; or
when $$\begin{cases} S_1 > N_{SC}/2 \\ S_2 < -N_{SC}/2 \end{cases},$$

the processor 1710 determines that the format of the data packet is the VHT format; or
when $$\begin{cases} -N_{SC}/2 < S_1 < N_{SC}/2 \\ -N_{SC}/2 < S_2 < N_{SC}/2 \end{cases},$$

the processor 1710 determines that the format of the data packet is a HEW format.

According to an embodiment of the present invention, the at least one signaling symbol includes a first signaling symbol and a second signaling symbol; and the processor 1710 detects a real part component and an imaginary part component of signaling information carried in the first signaling symbol to obtain a first detection result; compares the first detection result with a third threshold, where the third threshold is greater than 0; if the first detection result is greater than the third threshold, detects a real part component and an imaginary part component of signaling information carried in the second signaling symbol to obtain a second detection result or a second metric value; compares the second detection result with the third threshold; if the second detection result is greater than the third threshold, determines that the format of the data packet is a legacy format, or if the second detection result is not greater than the third threshold, determines that the format of the data packet is the VHT format; if the first detection result is not greater than the third threshold, compares the first detection result with a fourth threshold; and if the first detection result is less than the fourth threshold, determines that the format of the data packet is the HT format, or if the first detection result is not less than the fourth threshold, determines that the format of the data packet is the HEW format, where the fourth threshold is less than 0.

According to an embodiment of the present invention, the first detection result and the second detection result are obtained from the following formula:

$$S = \sum_{i=1}^{N_{SC}} (a_i^2 - b_i^2),$$

where
$N_{SC}$ is the quantity of subcarriers carrying the modulated signaling information, $N_{SC} \geq 1$, $a_i$ is the real part component that is of the modulated signaling information and that is carried on the subcarrier i, and $b_i$ is the imaginary part component that is of the modulated signaling information and that is carried on the subcarrier i.

For example, the at least one signaling symbol includes a first OFDM symbol and a second OFDM symbol, S obtained for the first OFDM symbol is $S_1$, and S obtained for the second OFDM symbol is $S_2$; if $S_1$ is greater than a third threshold and $S_2$ is greater than the third threshold, it is determined that the format of the data packet is a legacy format; or if $S_1$ is greater than a third threshold and $S_2$ is less than a fourth threshold, it is determined that the format of the data packet is the VHT format; or if $S_1$ is less a fourth threshold and $S_2$ is less than the fourth threshold, it is determined that the format of the data packet is the HT format; or if $S_1$ is less a third threshold and $S_1$ is greater than a fourth threshold, and, $S_2$ is less the third threshold and $S_2$ is greater than the fourth threshold, it is determined that the format of the data packet is a HEW format; where the third threshold is greater than 0, and the fourth threshold is less than 0.

According to an embodiment of the present invention, the at least one signaling symbol is at least one OFDM symbol, subcarriers in the OFDM symbol include an even-numbered subcarrier and an odd-numbered subcarrier, a signaling symbol carried on either of the odd-numbered subcarrier and the even-numbered subcarrier is modulated by using the binary phase shift keying manner of rotation by the first angle, and a signaling symbol carried on the other one of the odd-numbered subcarrier and the even-numbered subcarrier is modulated by using a binary phase shift keying manner of rotation by a second angle, where the second angle is M*45 degrees, and M is an integer.

According to an embodiment of the present invention, the format of the data packet is the high efficiency wireless local area network HEW format, the signaling field is a signaling field in a physical protocol data unit PPDU frame of the data packet, and the at least one signaling symbol is at least one of a HEW SIG A1 and a HEW SIG A2, where the HEW SIG A1 and the HEW SIG A2 are respectively a first signaling symbol and a second signaling symbol that follow an L SIG symbol in the PPDU frame.

According to an embodiment of the present invention, the signaling field is a signaling field in an advanced wireless system AWS, and the at least one signaling symbol is at least one of an AWS-SIG1 and an AWS-SIG2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting signaling, the method comprising:
   selecting a first angle of rotation for modulating at least first partial signaling information carried in at least a first signaling symbol in a signaling field of a data packet, wherein the first angle is not equal to 0 degrees or 90 degrees, wherein selecting the first angle of rotation comprises selecting the first angle of rotation according to a frame format of the data packet;
   selecting a second angle of rotation for modulating at least second partial signaling information carried in at least a second signaling symbol in the signaling field of the data packet, wherein the second angle is equal to 0 degrees;
   modulating, using a binary phase shift keying (BPSK) manner of rotation by the first angle, the at least first partial signaling information carried in the at least first signaling symbol in the signaling field of the data packet and modulating, using the BPSK manner of rotation by the second angle, the at least second partial signaling information carried in the at least second signaling symbol in the signaling field of the data packet, to obtain modulated signaling information; and
   sending, to a receive end, the data packet that carries.

2. The method according to claim 1, wherein the first angle is N multiplied by 45 degrees, and N is an integer not equal to 0 or 2.

3. The method according to claim 1, wherein modulating, by using the BPSK manner of rotation by the first angle, the at least first partial signaling information carried in the at least first signaling symbol in the signaling field of the data packet comprises:
   modulating, by using the BPSK manner of rotation by 45 degrees, all signaling information carried in one signaling symbol or two signaling symbols in the signaling field of the data packet.

4. The method according to claim 1, wherein the at least first signaling symbol is at least a first orthogonal frequency division multiplexing (OFDM) symbol, and subcarriers corresponding to each OFDM symbol in the at least first OFDM symbol comprise an even-numbered subcarrier and an odd-numbered subcarrier; and
   modulating, by using the BPSK manner of rotation by the first angle, the at least first partial signaling information carried in the at least first signaling symbol in the signaling field of the data packet comprises:
   modulating, by using the BPSK manner of rotation by the first angle, the at least first partial signaling information carried on either of the even-numbered subcarrier and the odd-numbered subcarrier.

5. The method according to claim 4, further comprising:
   modulating, by using the BPSK manner of rotation by the second angle, the at least second partial signaling information carried on the other one of the even-numbered subcarrier and the odd-numbered subcarrier.

6. The method according to claim 5, wherein the first angle is 45 degrees.

7. The method according to claim 1, wherein a real part component of the modulated signaling information is modulated using the BPSK manner of rotation by the first angle, and wherein an imaginary part component of the modulated signaling information is modulated using the BPSK manner of rotation by the second angle.

8. A method for transmitting signaling, the method comprising:
   receiving a data packet sent by a transmit end, wherein at least one signaling symbol in a signaling field of the data packet carries modulated signaling information, wherein the modulated signaling information is modulated using a binary phase shift keying (BPSK) manner of rotation by a first angle, wherein the first angle is selected according to a frame format of the data packet, and wherein the first angle is not equal to 0 degrees or 90 degrees; and
   detecting the modulated signaling information to determine the frame format of the data packet, wherein detecting the modulated signaling information to determine the frame format of the data packet comprises:
   detecting a real part component and an imaginary part component of the modulated signaling information; and
   comparing a result of detecting the real part component and the imaginary part component of the modulated signaling information with a preset threshold to determine the frame format of the data packet.

9. The method according to claim 8, wherein the first angle is N multiplied by 45 degrees, and N is an integer not equal to 0 or 2.

10. The method according to claim 9, wherein the at least one signaling symbol is at least one orthogonal frequency division multiplexing (OFDM) symbol; and detecting the real part component and the imaginary part component of the modulated signaling information, and comparing the result of detecting the real part component and the imaginary part component of the modulated signaling information with the preset threshold, to determine the frame format of the data packet comprises:

multiplying a real part component and an imaginary part component of modulated signaling information carried on each subcarrier corresponding to the at least one OFDM symbol to obtain at least one product, and adding up the at least one product to obtain a sum of the at least one product:

$$S_{HEW} = \sum_{i=1}^{N_{SC}} (a_i * b_i),$$

wherein
$S_{HEW}$ is a sum of a product of the modulated signaling information, $N_{SC}$ is a quantity of subcarriers carrying the modulated signaling information, $N_{SC} \geq 1$, $a_i$ is a real part component of the modulated signaling information and is carried on a subcarrier i, and $b_i$ is an imaginary part component that is of the modulated signaling information and is carried on the subcarrier i;

comparing $S_{HEW}$ with a first threshold, wherein the first threshold is greater than or equal to 0; and if $S_{HEW}$ is greater than the first threshold, determining that the frame format of the data packet is a frame format corresponding to the binary phase shift keying manner of rotation by the first angle.

11. The method according to claim 9, wherein the at least one signaling symbol is at least one OFDM symbol, and detecting the real part component and the imaginary part component of the modulated signaling information, and comparing the result of detecting the real part component and the imaginary part component of the modulated signaling information with the preset threshold, to determine the frame format of the data packet comprises:

adding up a square of modulated signaling information carried on each subcarrier corresponding to the at least one OFDM symbol to obtain at least one quadratic sum:

$$S = (a_s + jb_s) = \sum_{i=1}^{N_{SC}} (a_i + jb_i)^2,$$

wherein
S is a quadratic sum of the modulated signaling information, $N_{SC}$ is a quantity of subcarriers carrying the modulated signaling information, $N_{SC} \geq 1$, $a_i$ is a real part component of the modulated signaling information and is carried on a subcarrier i, $b_i$ is an imaginary part component of the modulated signaling information and is carried on the subcarrier i, $a_s$ is a real part component of S, and $b_s$ is an imaginary part component of S; and determining, according to the real part component and the imaginary part component of S, that the frame format of the data packet is a frame format corresponding to the binary phase shift keying manner of rotation by the first angle.

12. An apparatus for transmitting signaling, the apparatus comprising:
a memory storing a program;
a processor configured to execute the program, the program comprising instructions for:
selecting a first angle of rotation for modulating at least first partial signaling information carried in at least a first signaling symbol in a signaling field of a data packet, wherein the first angle is not equal to 0 degrees or 90 degrees, wherein selecting the first angle of rotation comprises selecting the first angle of rotation according to a frame format of the data packet;
selecting a second angle of rotation for modulating at least second partial signaling information carried in at least a second signaling symbol in the signaling field of the data packet, wherein the second angle is equal to 0 degrees;
modulating, using a binary phase shift keying (BPSK) manner of rotation by the first angle, the at least first partial signaling information carried in the at least first signaling symbol in the signaling field of the data packet and modulating, using the BPSK manner of rotation by the second angle, the at least second partial signaling information carried in the at least second signaling symbol in the signaling field of the data packet, to obtain modulated signaling information; and
a transmitter, configured to send, to a receive end, the data packet that carries the modulated signaling information.

13. The apparatus according to claim 12, wherein the first angle is N multiplied by 45 degrees, and N is an integer not equal to 0 or 2.

14. The apparatus according to claim 12, wherein the program further comprises instructions for modulating, by using a BPSK manner of rotation by 45 degrees, all signaling information carried in one signaling symbol or two signaling symbols in the signaling field of the data packet.

15. The apparatus according to claim 12, wherein the at least first signaling symbol is at least one orthogonal frequency division multiplexing (OFDM) symbol, and subcarriers corresponding to each OFDM symbol in the at least one OFDM symbol comprise an even-numbered subcarrier and an odd-numbered subcarrier; and the processor is configured to modulate, by using the BPSK manner of rotation by the first angle, first partial signaling information carried on either of the even-numbered subcarrier and the odd-numbered subcarrier.

16. The apparatus according to claim 12 wherein a real part component of the modulated signaling information is modulated using the BPSK manner of rotation by the first angle, and wherein an imaginary part component of the modulated signaling information is modulated using the BPSK manner of rotation by the second angle.

17. An apparatus for transmitting signaling, the apparatus comprising:
a receiver, configured to receive a data packet sent by a transmit end, wherein at least one signaling symbol in a signaling field of the data packet carries modulated signaling information, wherein the modulated signaling information is modulated using a binary phase shift keying (BPSK) manner of rotation by a first angle, wherein the first angle is selected according to a frame format of the data packet, and wherein the first angle is not equal to 0 degrees or 90 degrees;

a memory storing a program; and a processor configured to execute the program, the program comprising instructions for:

detecting a real part component and an imaginary part component of the modulated signaling information; and comparing a result of detecting the real part component and the imaginary part component of the modulated signaling information with a preset threshold to determine the frame format of the data packet.

18. The apparatus according to claim 17, wherein the first angle is N multiplied by 45 degrees, and N is an integer not equal to 0 or 2.

19. The apparatus according to claim 18, wherein the at least one signaling symbol is at least one orthogonal frequency division multiplexing (OFDM) symbol; and the processor is configured to: multiply a real part component and an imaginary part component of modulated signaling information carried on each subcarrier corresponding to the at least one OFDM symbol to obtain at least one product, and add up the at least one product to obtain a sum of the at least one product:

$$S_{HEW} = \sum_{i=1}^{N_{SC}} (a_i * b_i),$$

wherein $S_{HEW}$ is a sum of a product of the modulated signaling information, $N_{SC}$ is a quantity of subcarriers carrying the modulated signaling information, $N_{SC} \geq 1$, $a_i$ is a real part component of the modulated signaling information and carried on a subcarrier i, and $b_i$ is an imaginary part component that is of the modulated signaling information and that is carried on the subcarrier i; compare $S_{HEW}$ with a first threshold, wherein the first threshold is greater than or equal to 0; and if $S_{HEW}$ is greater than the first threshold, determine that the frame format of the data packet is a frame format corresponding to the binary phase shift keying manner of rotation by the first angle.

* * * * *